United States Patent
Lach et al.

(10) Patent No.: US 11,724,873 B2
(45) Date of Patent: Aug. 15, 2023

(54) CAPSULE FOR THE PREPARATION OF A BEVERAGE CONTAINING PELLETS

(71) Applicant: SOCIÉTÉ DES PRODUITS NESTLÉ S.A., Vevey (CH)

(72) Inventors: Laurent Joseph Henry Lach, Renens (CH); Fabien Jean Andre Goutal, Pontarlier (FR); Sandrine Champenois, Vaux et Chantegrue (FR); Enrico Induni, Grandson (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/321,110

(22) PCT Filed: Jul. 27, 2017

(86) PCT No.: PCT/EP2017/068959
§ 371 (c)(1),
(2) Date: Jan. 28, 2019

(87) PCT Pub. No.: WO2018/024587
PCT Pub. Date: Feb. 8, 2018

(65) Prior Publication Data
US 2019/0177079 A1 Jun. 13, 2019

(30) Foreign Application Priority Data
Aug. 3, 2016 (EP) .................................... 16182508

(51) Int. Cl.
*B65D 85/804* (2006.01)
*B65B 29/02* (2006.01)
(Continued)

(52) U.S. Cl.
CPC .......... *B65D 85/8046* (2013.01); *A23F 5/262* (2013.01); *A47J 31/34* (2013.01);
(Continued)

(58) Field of Classification Search
CPC ... B65D 85/8043; B65B 29/022; A23F 5/262; A47J 31/34; A47J 31/407
See application file for complete search history.

(56) References Cited

U.S. PATENT DOCUMENTS 2,931,728 A * 4/1960 Franck .................... A23F 5/267
426/432
3,511,666 A 5/1970 Hudson et al.
(Continued)

FOREIGN PATENT DOCUMENTS

GB 2334659 9/1999
WO 2004077964 9/2004
(Continued)

*Primary Examiner* — Viren A Thakur
*Assistant Examiner* — Chaim A Smith
(74) *Attorney, Agent, or Firm* — K&L Gates LLP

(57) ABSTRACT

The invention relates to a capsule for the preparation of a beverage in a beverage machine by feeding liquid in the capsule and extracting a beverage out of the capsule, wherein the capsule comprises containment walls forming an interior cavity containing beverage precursor; wherein the beverage precursor comprises a combination of non-compacted beverage extractable powder and pellets of compacted beverage extractable powder and wherein the largest dimension of each pellet is at least 3.5 millimeters. The invention enables to confer different beverage characteristics, for example, change the beverage extraction and aroma release kinetics, make more intense beverages and/or improve the beverage flow released from the capsule.

16 Claims, 15 Drawing Sheets

(51) Int. Cl.
*A23F 5/26* (2006.01)
*A47J 31/34* (2006.01)
*A47J 31/40* (2006.01)

(52) U.S. Cl.
CPC ........... *A47J 31/407* (2013.01); *B65B 29/022* (2017.08); *B65D 85/8049* (2020.05); *B65D 85/8052* (2020.05)

(56) References Cited

U.S. PATENT DOCUMENTS

| | | | | |
|---|---|---|---|---|
| 2003/0005826 | A1* | 1/2003 | Sargent | A23F 3/14 99/279 |
| 2007/0209524 | A1* | 9/2007 | Kim | B65D 85/8046 99/295 |
| 2011/0003040 | A1* | 1/2011 | Graf | A23G 1/50 426/98 |
| 2013/0071522 | A1* | 3/2013 | Mistry | B65D 85/8046 426/77 |
| 2013/0122153 | A1* | 5/2013 | Ferrier | B65D 85/8046 426/77 |
| 2013/0122156 | A1* | 5/2013 | Fisk | A23L 2/39 426/115 |

FOREIGN PATENT DOCUMENTS

| | | |
|---|---|---|
| WO | 2007009600 | 1/2007 |
| WO | 2011153064 | 12/2011 |
| WO | 2014005872 | 1/2014 |

\* cited by examiner

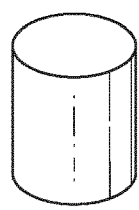 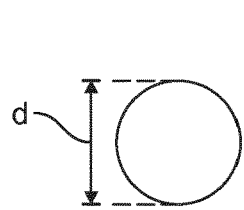 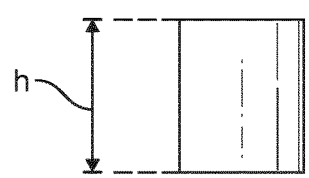
FIG. 8　　　　FIG. 9　　　　FIG. 10
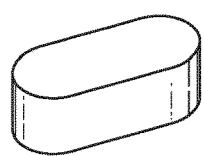 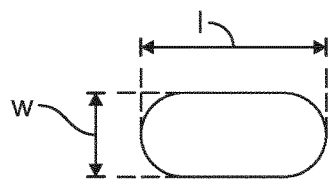 
FIG. 11　　　FIG. 12　　　FIG. 13
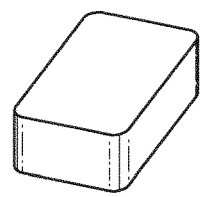 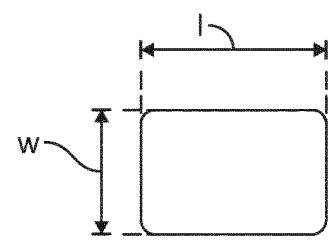 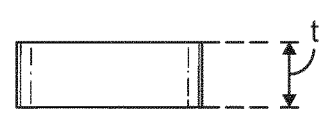
FIG. 14　　　FIG. 15　　　FIG. 16
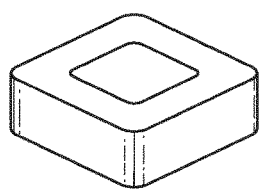 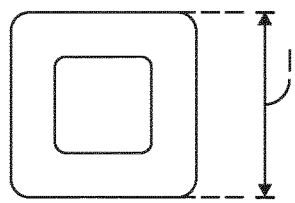 
FIG. 17　　　FIG. 18　　　FIG. 19

CAPSULE FOR THE PREPARATION OF A BEVERAGE CONTAINING PELLETS

CROSS REFERENCE TO RELATED APPLICATIONS

The present application is a National Stage of International Application No. PCT/EP2017/068959, filed on Jul. 27, 2017, which claims priority to European Application No. 16182508.8, filed on Aug. 3, 2016, the entire contents of which are being incorporated herein by reference.

FIELD OF THE INVENTION

The invention relates to a capsule for the preparation of a beverage in a beverage machine. The invention more particularly relates to an improved capsule and a method of manufacturing such capsule.

BACKGROUND

The preparation of a beverage using capsules containing a beverage substance is well known. In general, the capsule is inserted in a beverage extraction machine, such as a coffee machine, liquid is fed under pressure in the capsule to interact with the substance (also called hereafter "beverage precursor") and a beverage is extracted from the capsule.

Various capsule systems exist that works according to different beverage extraction principles.

For example, in EP0512470, coffee capsules are sealed hermetically by a foil that tears or perforates under the pressure building up inside the capsule. The foil tears against a support plate comprising a tearing structure with multiple pyramid- or ridge-shaped protrusions and multiple channels (known as the "pyramid plate") that is part of the machine.

WO 03059778 relates to a beverage system in which the capsule comprises a foil that tears or perforates under pressure to deliver the beverage without any engagement with a part of the machine. The capsule holds its own opening means and has a beverage duct to guide the beverage directly to the recipient.

U.S. Pat. No. 5,840,189 relates to a beverage filter capsule comprising a cup, a self-supporting filter received in the cup to subdivide the interior of the capsule in two chambers and an impermeable cover yieldably pierceable to accommodate an injection of liquid into one chamber for combination of the extract to produce the beverage, the bottom of the cup being yieldably pierceable to accommodate an outflow of the beverage from the chamber to the exterior of the capsule.

WO 2008148601 relates to a capsule and method for preparing a beverage using centrifugal forces. The method consists in preparing a beverage or liquid from a beverage substance contained in a capsule by passing water through the substance using brewing centrifugal forces comprising: feeding water in the receptacle, driving the receptacle in centrifugal rotation to force water to flow through the substance in a centrifugal flow path to a circumferential exit region with pierced orifices in the lid of the receptacle and collecting the centrifuged liquid extract.

WO 2011151626 relates to a beverage cartridge for use in a beverage preparation machine, the cartridge being formed from substantially water-impermeable materials and comprising an inlet for the introduction of an aqueous medium into the cartridge and an outlet for discharge of a beverage produced from the aqueous medium and one or more beverage ingredients contained in the cartridge, wherein the one or more beverage ingredients include one or more discrete edible components which are substantially insoluble in the aqueous medium, such as restructured fruit pieces, soft candies, fruit pastilles or flavoured nuggets, and which, in use, are dispensed from the cartridge with the beverage.

WO 2011153064 relates to a beverage cartridge comprising a composition comprising one or more beverage or food ingredients and at least one preparation aid which has a predetermined effect on the interaction between the liquid and the composition. The preparation aid comprises a plurality of bodies such as buoyant bodies formed of a substantially insoluble material such as plastics, coffee process streams (e.g., compressed pellets of extracted spent ground), meta-composites and combinations of these materials, in which the bodies have a diameter in the range of 0.1 to 200 mm.

US 2014370181A relates to a coffee composition for use in a single serve beverage unit. The beverage consists of a container having a structure to enable the introduction of a liquid and a structure to enable the release of coffee extract out of the container. The coffee composition can be formed of a mixture of a) instant coffee particles comprising from about 5% to 80% free-flowing compressed instant coffee flakes having a thickness within the range of from about 0.002 inch to about 0.01 inch, and a density within the range of from about 0.8 g/cc to about 1.7 g/cc and b) from about 20% to about 95% densified instant coffee powder, said powder having a bulk density of from about 0.3 g/cc to about 1.0 g/cc and comprised of particles having a size range of from about 5 μm to about 500 μm.

US 2014370181A also describes a coffee composition comprising: a) as a minor portion thereof, non-compressed, high grade roast and ground coffee particles of unimpaired natural flavor and aroma; and b) as a major portion thereof, roast and ground coffee selected from a class of coffee consisting of the low and intermediate grade coffees, said low and intermediate grade coffees being in the form of compressed flakes wherein the undesirable natural flavor and aroma constituents thereof have been diminished and the extractability thereof enhanced. The flakes are produced by grinding the roast coffee to an average particle size from about 300 to about 3000 μm, normalizing the ground product, and then milling the coffee to a flake thickness of from about 51 to about 1016 μm.

EP2310301B1 relates to a capsule for preparing a predetermined quantity of beverage comprising a circumferential wall, a bottom closing the circumferential wall at a first end and a lid closing the circumferential wall at a second end opposite the bottom, wherein the entrance and/or exit layer comprises a sheet-shaped perforate or porous layer in a manner that the flow resistance of the entrance area is lower than the flow resistance of the exit area when the capsule comprises the extractable product. The extractable product may be roast-and-ground compacted as tablets so that the flow resistance of the tablet increases toward the lid of the capsule. The tablets form a plurality of compacted layers with different flow resistance occupying the full interior of the capsule.

EP2361030B1 relates to a system for preparing a predetermined quantity of beverage suitable for consumption using a capsule which has an entry wall formed by a flexible porous sheet such as a sheet of filtering paper, a flexible foil such as polymeric film provided with a plurality of entrance openings, or wherein the second wall is substantially rigid and comprises a plurality of entrance openings. The capsule may also comprise extractable product which is compacted into a plurality of tablets, preferably of mutually different packing density.

EP2367741B1 relates to a capsule for preparing a predetermined quantity of beverage suitable for consumption using extractable product, for instance roast-and-ground coffee, comprising a circumferential first wall, a second wall closing the first wall and a perforated and/or porous third wall for draining the prepared beverage, wherein the extractable product in the inner space has particles falling within a preselected distribution by weight and the extractable product has been at least partly compacted.

CA808588 relates to a method for making coffee tablets.

U.S. Pat. No. 3,511,666 relates to a method for making a percolator package for use in brewing coffee by producing coffee tablets from degassed freshly roasted and ground coffee and wrapping the tablets in a non-woven fabric filter bag.

U.S. Pat. No. 3,770,457 relates to a method of making pelletized coffee percolator package comprising a degassing operation of the freshly roasted and ground coffee, a heating to achieve an equilibrium temperature, a compressing of the coffee into pellets and enclosing the pellets in porous filter material.

U.S. Pat. No. 3,607,299 relates to a method of making disposable pouched coffee comprising compressing roast and ground coffee to provide loosely agglomerated coffee ring, encasing the coffee ring in water-permeable fabric filter material to provide an encased loosely agglomerated coffee ring and disintegrating the agglomerated coffee ring to provide particulate compressed coffee in a fabric filter material pouch.

Pods with compacted coffee also exist but the coffee forms a compacted tablet along its whole transversal section. The pod is very sensible to breakage causing preferred flow paths between the broken bits which has for consequence a bad coffee extraction.

WO2009081250 relates to a tablet in the form of a food product such as coffee that comprises means for conveying fluid such as hollow means.

WO2012168764 relates to a capsule for infusing a food product such as coffee, tea, cocoa, chocolate, chamomile and the like, comprising a hollow supporting body that can be used in a suitable equipment and constituting a housing for holding the food product and the food product being in the form of a food product tablet to be infused.

GB2334659A relates to a beverage composition comprising an agglomerate of an insoluble beverage material and a soluble material. The insoluble material may be tea, coffee, cocoa or herbs, and the soluble material may be a non-dairy or diary based whitener. A mixture of the two materials is steam agglomerated, dried and placed in infusion bags.

WO2004077964A1 relates to particles for use in delivering a distinct and enhanced taste sensation to a drink, while not impacting the taste of the drink itself, wherein the particles are adapted for floating on or being suspended in a drink without dissolving in said drink, and wherein said particles comprise at least one flavor component incorporated therein.

There is no satisfactory solutions for varying the extraction kinetics of the beverage, such as for providing a delayed extraction that could offer different characteristics to the produced beverage. Normally, a delayed extraction would require increasing the particle size of the substance but this approach is limited by the storage capacity of the capsule. It is also possible to increase the density of the powder filled in the capsule by forcing the powder through a series of normalizers. However, the particle size distribution is not changed very much and the kinetics of extraction remain the same.

There is also no satisfactory solutions for providing more intense beverages, such as for long coffee, without being limited by the storage capacity and without affecting the beverage flow coming out of the capsule.

There is also no efficient solution for modulating the extraction efficiency, in particular, for the extraction of coffee from a capsule.

There is also no satisfactory solution for providing easily a wide range of different beverages, e.g., various coffee styles using the same format of capsules.

The present invention aims at providing a solution that overcomes these barriers to usual capsules and offers new opportunities to design different and/or improved beverages. In particular, the invention can provide different extraction kinetics (i.e., coffee solids and/or aroma release kinetics), in particular, delayed extraction of the substance that may confer different beverage characteristics such as different aromatic or sensory attributes, or more intense beverages. The invention also offers the opportunity to provide more easily beverages of different characteristics without changing the volume of the capsule.

SUMMARY AND DESCRIPTION OF THE INVENTION

The invention relates particularly to a capsule for the preparation of a beverage in a beverage machine by feeding liquid in the capsule and extracting a beverage out of the capsule, wherein the capsule comprises containment walls forming an interior cavity containing beverage precursor for mixing with the liquid in the cavity; wherein the beverage precursor comprises a combination of non-compacted beverage extractable powder and pellets of compacted beverage extractable powder and wherein the largest dimension of each pellet is at least 3.5 millimeters, more preferably at least 4 mm.

The pellets are elements which are preferably arranged randomly relative to one another in the cavity. It is meant that the pellets are not layers which are arranged in a privileged direction and liquid can flow in and around each pellet. The largest dimension of each pellet is preferably smaller than any cross-section of the interior cavity. It is meant that each pellet is smaller than a layer that would theoretically occupy the full transversal and/or axial cross section of the interior cavity. Preferably, the largest dimension of each pellet is smaller than 25 mm, more preferably smaller than 20 mm, most preferably smaller than 15 mm.

It has been surprisingly found that this combination of non-compacted extractable powder and pellets provides different extraction kinetics while providing other important advantages such as maintaining acceptable beverage flow delivered from the capsule and increasing the possible maximum weight of beverage precursor in the capsule and so possibly improving the intensity of the beverage.

The terms "extractable powder" relates to a particles' powder or granular material (e.g., agglomerated soluble powder or agglomerated particles), which can produce a liquid extract of beverage upon interaction with a liquid such as water; the concentration of the liquid extract depending 'inter alia' on the amount of liquid and the powder-to-liquid ratio.

By "non-compacted beverage extractable powder" it is meant that an extractable powder or granular material (e.g., agglomerated soluble powder) that is not compacted in handle-able pieces or in granules of individual size of more than 3 mm, preferably 2 mm. The powder can still be densified up to a tapped density of about 450 g/l maximum by using a normalizer to push the powder before filling the capsule or tapped in the capsule by vibration but in such case the possible formed powder clumps cannot be handled without disaggregating.

In a mode, the beverage precursor is essentially, roast-and-ground coffee. Preferably, the pellets are also made of essentially roast-and-ground coffee. In a mode, the pellets are made of purely roast-and-ground coffee.

By "essentially roast-and-ground coffee", it is meant that at least 60% in weight of the beverage precursor is roast-and-ground coffee.

Possibly, non-roast-and-ground coffee pellets can be used. The non-roast-and-ground part of beverage precursor can be green coffee, soluble (instant) coffee, cocoa or chocolate powder, whitener or milk powder, soja, flavourings and combinations thereof.

The beverage precursor may be purely roast-and-ground coffee. By "purely roast-and-ground" it is meant that at least 98% in weight of the beverage precursor is roast-and-ground coffee. The possible remaining part of non-roast-and-ground coffee can be aroma (e.g. aroma oils or microcapsules), flavourings, taste enhancers, sweeteners or other beverage precursor compounds.

In a mode, the beverage precursor is in majority non-roast-and-ground coffee. The precursor can be green coffee, soluble (instant) coffee, cocoa or chocolate powder, whitener or milk powder, soja, flavourings and combinations thereof. In particular, the pellets of compacted beverage extractable powder can be non-roast-and-ground coffee. In particular, the pellets of compacted beverage extractable powder can be whitener or milk powder, soluble coffee, cocoa or chocolate powder and combinations thereof. In particular, the non-compacted beverage extractable powder can be roast-and-ground coffee or a mixture of roast-and-ground coffee and non-roast-and-ground coffee (e.g. soluble coffee) and the pellets of compacted beverage extractable powder can be whitener or milk powder, soluble coffee, cocoa or chocolate powder and combinations thereof.

The choice of the ratio of pellets-to-non-compacted powder may depend on different parameters such as the composition or type of powder, its extractability, the particle size of the powder for the pellets, the particle size of the powder for the non-compacted powder, the total weight of beverage precursor in the capsule and certain extraction parameters (e.g. water pressure, water temperature, water flow rate). The choice may also depend on the type or style of beverage to be produced such as on the cup size and style (e.g. espresso, lungo, long cup, Latte-macchiato, filter coffee). Preferably, the percentage of pellets to the total weight of the roast-and-ground coffee in the cavity is comprised between 10 and 90 wt. %, preferably of 20 to 80 wt. %, most preferably 25 to 75 wt. %. Above the highest limit of percentage of pellets, the extraction of the beverage, e.g., coffee, is less efficient. In particular, a too low coffee extraction yield, e.g., 15 wt. %, is obtained. Moreover, still above the highest limit, for some variants, in particular, for low particle size, it can be observed beverage flow issues with possible blockage or reduction of flow to a drop-by-drop. Furthermore, the deposit in the cup of small coffee particles can also be observed in particular for low particle sizes. Such problems are not observed when the combination stays within the defined range. Below the lower limit, the extraction kinetics may not be significantly changed as compared to standard capsules. The beverage intensity can also not be achieved and beverage flow tends to stop, as a result of attempting to achieve more intense beverages, in particular, coffee with high totals solids and high extraction yields. Also, surprisingly the kinetics of volatiles extraction are clearly influenced by the presence of pellets in the capsule. In particular, the aroma kinetics of capsules containing pellets in the defined range show a delay for almost all odorants (and mainly for high and medium polar compounds) compared to capsules with no pellets.

In preferred examples of the invention, the ratio of pellets coffee powder to non-compacted coffee powder can be about (i.e. +/−2%): 20 wt. % to 80 wt. % or 25 wt. % to 75 wt. % or 30 wt. % to 70 wt. % or 35 wt. % to 65 wt. % or 40 wt. % to 60 wt. % or 50 wt. % to 50 wt. % or 80 wt. % to 20 wt. % or 75 wt. % to 25 wt. % or 70 wt. % to 30 wt. % or 65 wt. % to 35 wt. % or 60 wt. % to 40 wt. %.

Preferably, the combination of pellets of beverage extractable powder and non-compacted beverage extractable powder is preferably a mixed combination, i.e., non-compacted powder occupying at least partially the space left between pellets in the capsule. The pellets can be positioned in the interior cavity randomly. However, the position of the pellets in the capsule may impact the extraction performance. In a preferred configuration, the containment walls of the capsule comprise a liquid inlet wall and a beverage outlet wall and the majority of the pellets are preferably positioned closer to the liquid inlet wall than to the beverage outlet wall. More preferably, essentially all the pellets, i.e., more than 60 wt. % of the total weight of pellets, are positioned in a group adjacent the liquid inlet wall. The positioning of the pellets on the side of the inlet wall tends to provide a more efficient beverage extraction, e.g. a higher coffee total content of solids extracted in the cup. Moreover, a reduced flow time can also be observed that can be an advantage especially when preparing long beverage cups.

The envelope density of the pellets is comprised between 500 and 1200, more preferably between 750 and 1100, most preferably between 800 and 1080. The envelope density may vary significantly as function of the compaction pressure of the pellets and the particle size, i.e., average diameter $D_{4,3}$ of the power before compaction. In particular, for high particle sizes (such as coffee $D_{4,3}$ at 600 μm), a lower density of pellets provides a higher extraction efficiency, in particular, a higher coffee extraction yield. This effect may not be perceived for lower particle sizes (such as coffee $D_{4,3}$ at 240 μm).

In particular, the pellets may be compacted with a compaction pressure of at least 5 $kN/cm^2$, preferably a compaction pressure between 5 and 150 $kN/cm^2$, more preferably between 5 and 80 $kN/cm^2$, even more preferably between 5 and 40 $kN/cm^2$, and most preferably between 10 and 40 $kN/cm^2$. Like for the envelope density, the smaller compaction pressures provide generally higher extraction efficiency for relatively high particle sizes. The extraction efficiency decreases and the extraction is delayed as the compaction pressure increases.

The particle size of the compacted beverage powder for the pellets of compacted beverage extractable powder in the capsule may be selected within a wide range of values. The selection may depend on different parameters such as the type and composition of the power, its extractability, the pellet-to-non-compacted powder weight ratio, the total weight of beverage precursor in the capsule and certain extraction parameters (e.g. water pressure, water temperature, water flow rate). The selection also depends on the type of beverage to be produced such as on the cup size and style (e.g. espresso, lungo, long cup, latte-macchiato, filter coffee). For roast-and-ground coffee, the pellets are preferably compacted from loose roast-and-ground coffee powder with a $D_{4,3}$ average diameter comprised between 160 μm and 1000 μm, preferably of 240 μm to 700 μm, more preferably of 240 μm to 600 μm, most preferably 300 μm and 500 μm. In possible examples of the invention, the beverage powder for the pellets has an average diameter $D_{4,3}$ of about (i.e., +/−24): 240 μm or 300 μm or 350 μm or 400 μm or 450 μm or 500 μm or 550 μm or 600 μm or 670 μm. The particle sizes of coffee for producing the coffee pellets may influence the extraction efficiency, especially, the amount of total solids in the cup and extraction yield. Generally, it is found that the higher the particle size, the lower the extraction efficiency. The extraction kinetics are also influenced by the particles size of the powder. For example, the smaller particle sizes clearly experience a faster extraction rate of the soluble matter in the coffee compared to a reference without pellets. On the contrary, higher particle sizes show a slower extraction of the soluble matter compared to a reference without pellets. This delayed extraction may be of interest especially for long cup sizes as it may prevent the over-extraction of the beverage precursor, which is generally at the origin of the generation of undesired, e.g. bitter notes. Also, all characteristics of the capsule being equal, the average flow rate is found to be comparatively lower for average diameter $D_{4,3}$ of 240 μm than for average diameter $D_{4,3}$ of 600 μm (average diameter of particles of the beverage powder before compaction).

The particle size of the non-compacted beverage extractable powder in the capsule may be selected within a wide range of values. The selection may depend on different parameters such as the type or composition of the power, its extractability, the pellet-to-non-compacted powder weight ratio, the total weight of beverage precursor in the capsule and the extraction parameters. In general, the powder may have a $D_{4,3}$ average diameter between 160 and 1000 μm. For roast-and-ground coffee, the non-compacted beverage powder has an average diameter $D_{4,3}$ comprised between 160 μm and 1000 μm, preferably 240 μm to 800 μm, more preferably 240 μm and 700 μm, most preferably 250 μm to 500 μm. In possible examples of the invention, the non-compacted beverage powder has an average diameter $D_{4,3}$ of about (i.e., +/−24): 300 μm or 350 μm or 400 μm or 450 μm or 500 μm or 550 μm or 600 μm or 670 μm or 700 μm. The extraction may therefore be further modulated by the choice of the particle size of the non-compacted powder.

The pellets have preferably an envelope volume comprised between 45 and 1200 mm³, preferably an envelope volume of 50 to 1000 mm³, most preferably 150 and 950 mm³. Too large volume pellets may create large unoccupied areas in the capsule which may be at the origin of preferred liquid flow path in the capsule, and may result in inefficient extraction. Also too large pellets are less prone to correct penetration of liquid in their core and those that fully obstruct the transversal cross-section of the capsule can significantly reduce the flow or even create flow blockage during extraction. Pellets of too small volume would not have a significant impact on the extraction kinetic such as on the delaying effect sought. Generally, the volume of the pellets can be selected in the defined range to regulate the flow rate considering that generally the larger the volume the smaller the flow rate.

In an aspect, the filling density of beverage precursor in the cavity can be high compared to existing beverage capsules without risking significant flow reduction or blockage. Such ability to fill a higher amount of beverage precursor in the capsule provides the opportunity for delivering longer beverages and/or more intense beverages. In particular, the filling density may be comprised between 0.35 and 0.68 g/ml, preferably, 0.4 and 0.65, most preferably 0.41 and 0.62.

The shape of the pellets can differ widely. In particular, the pellets may have any one of the following shapes: spheres, cylinders, cubes, pyramids, cones or frustum-cones, parallelepiped, oblong or ellipsoid shapes and combinations thereof. Certain shapes may be preferred but a more important factor would be the smallest dimension of the shape that may influence the extraction efficiency. Generally, the lower the smallest dimension (while maintaining a sufficient overall volume of the pellet), the more efficient and faster the extraction. Therefore, certain shapes may provide a more efficient extractions, in particular elongated shapes such as oblong or parallelepiped shapes with a small thickness, than others, such as spheres.

Preferably, the smallest dimension of the pellets is comprised between 1.5 and 13 mm, more preferably between 2 and 8 mm, most preferably between 2.5 and 6 mm. Indeed, the smallest dimension should not be too small to reduce the risk of breakage of the pellets e.g. during capsule's transport and handling. It should also not be too large to enable liquid to still penetrate to the core of the pellet during extraction.

In particular preferred possible solutions, for a majority of pellets in the capsule (more preferably 90 wt. % of pellets), the pellets have the following smallest dimension's higher limit:
When for spheres, a diameter of less than or equal to 12 mm,
When for a cylinders, pyramids, cones or frustum-cones, a height of less than or equal to 8.3 mm and/or a diameter or width (whichever is/are the smallest dimension(s)) of less than or equal to 12 mm,
When for an elongated non-cylindrical form like oblong, ellipsoid, a thickness and/or width (whichever is/are the smallest dimension(s)) of less than or equal to 5 mm.

The capsule's beverage outlet wall may be closed. It may preferably comprise a closed perforable or tearable foil such as a mono-layer of aluminium or a multilayer of aluminium and polymer or of aluminium, cellulose and/or polymer or of cellulose and polymer.

The beverage outlet wall of the capsule may be initially closed before extraction or before insertion in the machine and opened by mechanical means and/or by effect of the pressure building in the capsule during extraction. The mechanical means may be part of the capsule or part of the machine itself, such as part of a capsule support. The capsule's foil may be punctured or torn for creating one or a multitude of orifices. The orifices may be obtained or promoted by one or a multitude of pre-weakening zones, e.g., weakening lines or points, in the wall. The outlet wall may comprise an additional filter layer in association with the closed foil. The filter layer is preferably positioned between the foil and the beverage precursor or alternatively between the foil and the exterior. The filter layer may be a polymeric woven or non-woven, or a polymer film with small openings or may be a cellulose-based or vegetal fiber filter or a combinations thereof.

Alternatively, the capsule's beverage outlet wall may be pre-opened. It may thus comprise a porous or perforate mono- or multi-layer such as a polymeric film and/or cellulose layer provided with a plurality of exit openings. The layer may be a polymeric woven or non-woven, or a polymer film with small openings or may be a cellulose-based or vegetal fiber filter or a combinations thereof. The layer can be associated with a rigid supporting and/or or a flow guiding structure which may be a part of the outlet wall or be a part of the body of the capsule or be a separate insert e.g. lodged between the body of the capsule and the beverage outlet wall.

In general, the containment walls preferably comprise a cup-shaped body on which or inside which the foil or mono- or multi-layer is sealed. The body is self-standing so as to physically protect the beverage precursor. It is preferably rigid enough to not easily be manually collapsed or its shape significantly deformed. The body can be made and formed of: aluminium, laminate of aluminium and polymer, polymer mono- or multilayer. The body may have a plain perforable bottom wall or alternatively may have a pre-perforate bottom for liquid supply or beverage outflow or a bottom with a beverage outlet duct with one or several outlet openings. When the body has a perforable bottom, it can be formed of a material that is adapted for perforation by a liquid injector or perforating members such as blades for creating orifices for the supply of liquid in the capsule using extraction. For example, the body may be formed of aluminium or aluminium-polymer laminate of thickness typically between 200 and 750 microns.

In a preferred mode, the beverage outlet wall is a tearable extraction foil formed of a foil of aluminium of thickness (measured before eventual embossing) comprised between 20 and 50 µm, most preferably between 25 and 40 µm. A preferred example is an aluminium foil of about (i.e. +/−2): 30 µm. Such foil generally tears or perforates against the extraction plate when a sufficient pressure of liquid is attained in the liquid injection means of the device, for example, a liquid pressure of from about 3 to 12 bar (pressure measured in the fluid circuit upstream the extraction chamber).

The invention further relates to a method for manufacturing a capsule for the preparation of a beverage as aforementioned wherein it comprises filling the cavity of the capsule with non-compacted beverage powder and with pellets of compacted beverage powder wherein the largest dimension of each pellet is at least 3.5 millimeters but is smaller than any possible cross-section of the interior cavity.

Preferably, the majority of the pellets are positioned closer to the liquid inlet wall than to the beverage outlet wall. In a mode, the beverage precursor is filled in a cup-shaped body of the capsule with the pellets being filled first followed by the non-compacted extractable powder. In another mode, the beverage precursor is filled in a cup-shaped body of the capsule on a beverage outlet wall, with non-compacted extractable powder being filled first followed by the pellets. The body is then sealed by a mono- or multi-layer foil. The foil may be part of the beverage outlet wall or may be the liquid inlet wall depending on the type of capsule; such type depending on the beverage machine the capsule is intended to.

Preferably, before filling, roast-and-ground coffee is compacted into pellets with a compaction pressure of at least 5 kN/cm$^2$, preferably a compaction pressure between 5 and 150 kN/cm$^2$, more preferably between 5 and 40 kN/cm$^2$, even most preferably between 10 and 40 kN/cm$^2$. The compaction may be formed in any suitable powder compacting press. Preferably, roast-and-ground coffee is selected for compaction into pellets with an average diameter $D_{4,3}$ between 160 µm and 1000 µm, preferably of 240 µm to 700 µm, more preferably of 240 µm to 600 µm, most preferably between 300 µm to 500 µm.

Generally, increasing the compaction force of pellets for coarse powder (e.g. 600 µm) allows to further delay the extraction of soluble matter. Tests have shown that at low compaction force (e.g. below 5 kN/cm$^2$), the beverage flow rate is considerably reduced (causing possible pump stopping) in particular when the total weight of roast-and-ground coffee in the cavity is relatively high (e.g. 8 grams). Therefore, a minimum compaction of the pellets is necessary for providing a sufficient beverage flow during extraction. In particular, no flow issue was observed with a combination of non-compacted roast-and-ground coffee and roast-and-ground coffee pellets (e.g. respectively of 25 wt. % and 75 wt. %) at a compaction force of the pellets of 10 kN/cm$^2$.

Preferably, the method comprises filling the cavity with the beverage precursor such that the percentage of pellets to the total weight of the roast-and-ground coffee in the cavity is comprised between 10 and 90 wt. %, preferably of 20 to 80 wt. %, most preferably 25 to 75 wt. %.

Preferably, the method comprises, filling the cavity with beverage precursor and subsequently closing the cavity such that the filling density is comprised between 0.35 and 0.68 g/ml, preferably, 0.4 and 0.65, most preferably 0.41 and 0.62.

Of course, the method for manufacturing encompasses all possible aforementioned features of the capsule and combinations thereof.

The invention further relates to a method for preparing a beverage from a capsule containing beverage precursor in a beverage preparation device comprising:
    providing a capsule as defined before, feeding liquid under pressure in the interior cavity containing the beverage precursor and extracting a beverage out of the capsule.

Definitions

The "total solids" ($T_c$) is defined as the percentage in weight of the extracted solids contained in the beverage or liquid extract divided by the total weight of the liquid extract. It is measured with a calibrated refractometer, Bellingham & Stanley RFM340+ model.

The "extraction yield" represents the percentage of solids in the beverage precursor extracted from the beverage precursor as powder (in non-compacted or compacted form).

The extraction yield can be calculated by the relation:

$$\text{Yield }(\%)=T_c\cdot M_e/M_p$$

where $T_c$ represents the percentage of total beverage solids in the beverage (e.g. coffee extract) $M_e$ represents the weight of the beverage or coffee extract, and $M_p$ represents the weight of the beverage precursor (e.g., coffee powder) contained in the capsule.

The "average diameter $D_{4,3}$" (or also referred as "particle size" in the text) represents the mean volumetric diameter of the powder and corresponds to the diameter at the position of the center of gravity of the particle size distribution. The particle size distribution is measured under dry conditions using a laser diffraction instrument Malvern® Mastersizer 2000, software version 5.60. For dispersing the samples, a dispersion unit, Sirocco is used at air pressure of 2 bar. The conditions follow the recommendations of ISO 13320-1. The particle size distribution in micrometer is expressed in vol. %.

The "Flow time" (FT) represents the time it takes to fill a cup of defined beverage (e.g. coffee) starting from first drops in the cup until the desired extraction volume is reached in the cup (e.g. 40 g for espresso, 110 g for lungo cup sizes). It is measured in seconds with a balance connected to a computer using a data-acquisition program. The chronometer starts when weight is greater or equal to 0.3 g and stops when the targeted weight of extract is obtained.

The "envelope volume" is the volume of the pellet at its outer surface as would be obtained by tightly shrinking a film to contain it. The envelope volume can be determined by capturing the pellet by 3-D scanning using e.g. computer tomography and modelling it to eliminate the deviations and small surface defects.

The "envelope density" represents the ratio of the mass of the pellet to the envelope volume of the pellet. It is expressed in g/liter.

In any range of values given in the description, when the terms "between . . . and" is used, the limit values are included in the range.

The "largest dimension" of the pellet is determined by measuring the distance separating the two farthest points on the envelope surface of the pellet.

The "smallest dimension" of the pellet is determined by measuring the distance separating the two closest points on the envelope surface of the pellet.

The "filling density" represents the weight of beverage precursor per unit volume available in the cavity of the capsule dedicated for the beverage precursor. It is obtained by dividing the total weight of the beverage precursor by the available volume of the cavity. It is expressed in $g \cdot ml^{-1}$.

BRIEF DESCRIPTION OF THE FIGURES

Embodiments of the present invention will now be described, by way of examples only, with reference to the accompanying drawings, in which:

FIGS. 8 to 10 illustrate (by respective perspective, top and side views) a pellet of cylindrical form for the capsule of the invention;

FIGS. 11 to 13 illustrate (by respective perspective, top and side views) a pellet of oblong form for the capsule of the invention;

FIGS. 14 to 16 illustrate (by respective perspective, top and side views) a pellet of parallelepiped elongated form for the capsule of the invention;

FIGS. 17 to 19 illustrate (by respective perspective, top and side views) another pellet of parallelepiped squared form for the capsule of the invention;

Figure 1:
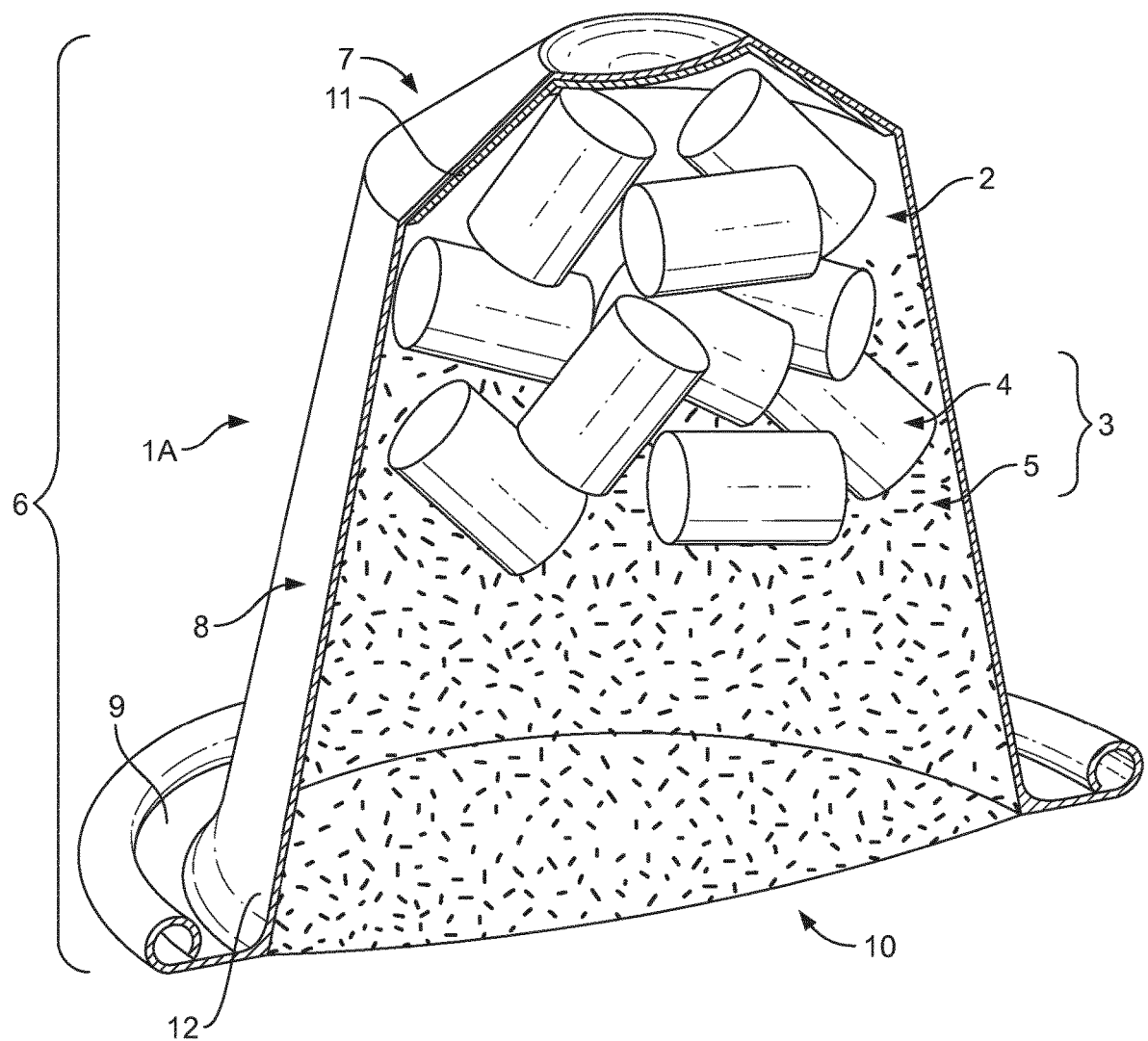
FIG. 1 shows a cross-section view of a capsule of the invention with a tearable extraction foil sealed to the flange of a cup-shaped body, which can produce a beverage in a beverage machine by injection of water through the body and by extraction of the beverage through the foil once perforated (e.g., "Nespresso® Original Line" format of capsule)

The capsule 1A for preparation of a beverage of FIG. 1 comprises containment walls forming an interior cavity 2 filled with a beverage precursor 3. The beverage precursor comprises a combination of pellets 4 formed of compacted beverage extractable powder and non-compacted beverage extractable powder 5 (as defined earlier). The capsule comprises a cup-shaped body 6 having a substantially frustum shape with a liquid inlet wall 7 and a side wall 8. The body extends outwardly at its base by a circumferential flange 9. The body is preferably closed by a closed tearable foil 10 which forms the beverage outlet wall and is preferably sealed on the outer surface of the flange. The capsule may optionally comprise a filter element 11 connected or simply placed adjacent the internal surface of the liquid inlet wall 7. The filter element may be a thin polymeric, e.g. polyurethane web, which serves to reduce the back flow of liquid and solid residues after extraction as discussed in EP1165398B1 and EP1190959B1. The capsule may also optionally comprise a seal means 12 such as a soft and/or deformable annular portion, an annular ring, step or lip(s) for providing a liquid-tight arrangement with a capsule enclosing part of the beverage machine as discussed in, for example, EP1654966B1, EP1816934B1, EP2631199, EP2631198, WO2014184652, WO2015011683, WO2015101394, WO2016041596.

The pellets 4 are preferably in majority positioned closer to the liquid inlet wall 7 than to the beverage outlet wall 10. Most preferably, the pellets are all assembled in a group adjacent the liquid inlet wall, e.g., against internal filter element 11. The free volume left by the pellets in the cavity is at least partially filled with the non-compacted beverage powder, e.g., roast-and-ground coffee. The non-compacted beverage powder may be slightly densified (e.g. by normalizer) but can be easily disaggregated when attempted to be handled thereby not forming handle-able elements like the pellets. The remaining free space is occupied by gas, preferably inert gas such as carbon gas and/or nitrogen, causing possible internal pressure and an outward deformation of the (more flexible) outlet wall 10.

The pellets could also be positioned differently. For example, they could be distributed evenly in the cavity and the non-compacted powder can partially fill the space left between the pellets, with some gas filling the left free space.

In a preferred mode, the beverage precursor is essentially, most preferably purely, roast-and-ground coffee.

In another mode, the beverage precursor contains roast-and-ground coffee and soluble coffee.

In another mode, at least some, preferably a majority, most preferably all pellets are made of a first beverage precursor and a part, preferably a major part of, most preferably all non-compacted beverage extractable powder is made of a second beverage precursor which is different from the first beverage precursor. The first precursor can be, for instance, roast-and-ground coffee and the second precursor can be soluble coffee or vice versa. Roast-and-ground coffee can be mixed with soluble coffee in the pellets and/or in the non-compacted coffee powder.

Figure 2:
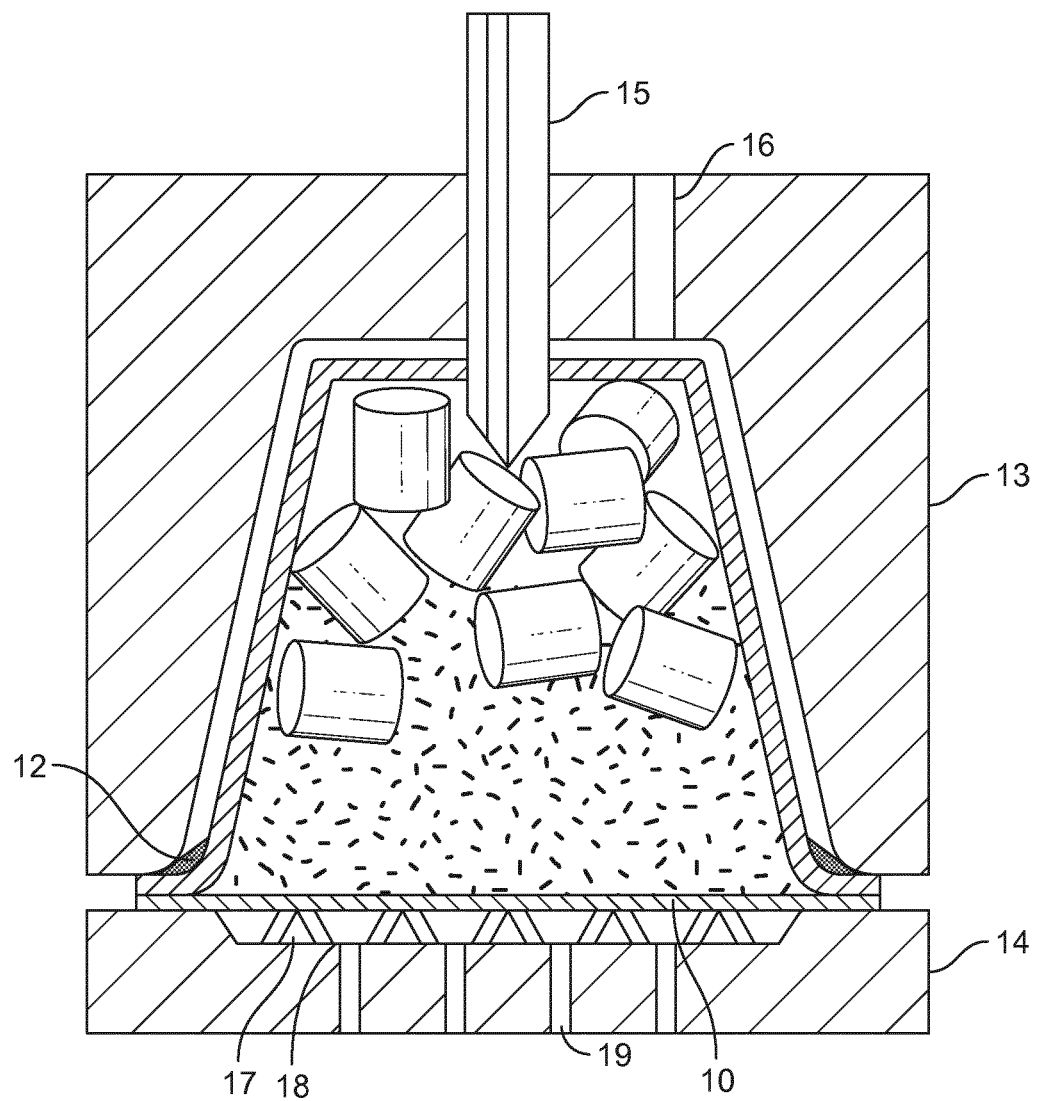
FIG. 2 shows a schematic view of system of the capsule of FIG. 1 and an extraction device of a beverage machine.

FIG. 2 shows an example of an extraction system for preparing a predetermined quantity of beverage suitable for consumption using a capsule containing the beverage precursor as in FIG. 1. The extraction system is part of a beverage machine and comprises a capsule cage 13 for receiving the capsule 1A and injecting liquid in and a capsule support 14 for pressing the capsule relatively against the capsule cage, in particular at a circumferential portion of it, and for collecting beverage out of the capsule. A liquid-tight engagement is obtained between the capsule cage 13 and the flange of the capsule, in particular, by the end of the cage pressing on the seal means 12.

The capsule cage comprises piercing means 15 for perforating the liquid inlet wall and enabling liquid fed via at least one liquid conduit 16 in the capsule cage to enter in the capsule. The liquid conduit is typically connected upstream to a fluid circuit of the beverage machine including a liquid reservoir, a heater, a high-pressure liquid pump (not shown). A control unit is also responsible for controlling these components, in particular, the amount and temperature of liquid supplied in the capsule (not shown).

The piercing means can be one or more needles or blades. The piercing means can also, in certain configurations, be traversed by the liquid conduit 16. On the capsule support 14, a tearing structure can be present such as a network of small relief elements 17 formed between channels 18. The support plate also comprises draining means such as holes 19.

For preparing a beverage, liquid in particular hot water is supplied in the capsule thereby interacting with the beverage precursor. When the pressure of liquid rises in the capsule during extraction, the beverage outlet wall 10 of the capsule engages against the tearing structure of the capsule support until such wall formed by the foil tears at several (multiple) locations thereby creating orifices for the beverage to drain. The beverage can therefore be drained out of the capsule and through the support 14 via draining holes 19.

It should be noted that the system can be designed according to many different variants. For example, the opening structure can be different. It could be formed of a single central cutting or perforating pointer.

Figure 3:
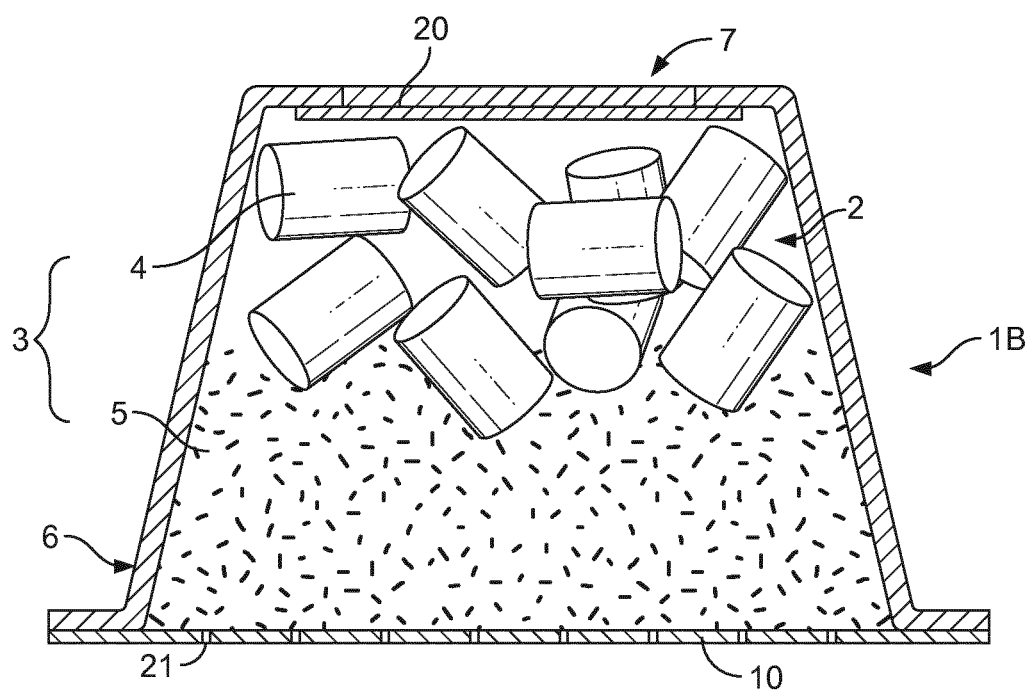
FIG. 3 shows a cross-section of a second possible mode of a capsule of the invention, in particular, a capsule with a pre-opened beverage outlet wall; possibly exchangeable (with suitable dimensions) with the capsule of FIG. 1 in the system of FIG. 2.

In FIG. 3, the capsule 1B is a variant of the capsule 1A and can so be inserted in the beverage device of FIG. 2 for preparing a beverage. The capsule also comprises containment walls delimiting a cavity 2, possibly of smaller volume that the one of the capsule 1A. The beverage precursor 3 also comprises pellets 4 and non-compacted powder 5 in various possible ratios. The pellets 4 may be of similar individual volume as the ones in capsule 1A or of smaller volume. The capsule comprises a liquid inlet wall 7 which is pre-opened. In particular, it can have a filter sheet 20 which is sealed to a cup-shaped body 6 of the capsule. In a possible variant (not shown), the inlet wall 7 is the top wall of the body which has multiple small openings. In another possible variant, the top wall is closed and requires perforation by the piercing means 15 of the device for enabling the injection of liquid in the capsule. The openings are dimensioned small enough to prevent significant loss of beverage precursor through the wall.

The beverage outlet wall 10 can be a polymer foil with a multitude of small filter openings 21 which is sealed to the flange of the body. The openings have a size generally between 20 and 150 microns. In a variant, the beverage outlet wall is a closed tearable foil like the one of capsule 1A.

The beverage precursor 3 can be the same as in capsule 1A.

Figure 4:
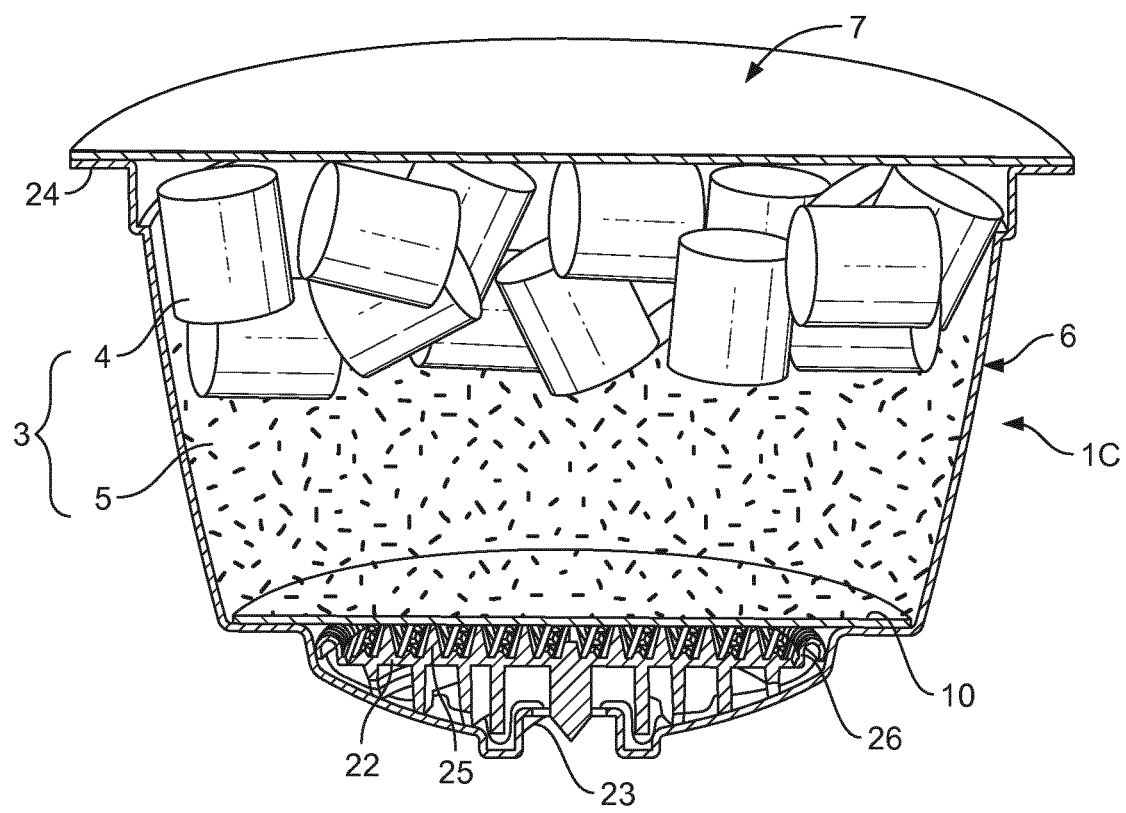
FIG. 4 shows a cross-section of a third possible mode of a capsule of the invention, in particular, with a cup-shaped body inside which a beverage outlet wall is sealed and on the flange of which a liquid inlet wall is sealed; such capsule being adapted to produce a beverage in a (e.g., "Nescafé Dolce Gusto®"-branded) beverage machine.

The capsule 1C of FIG. 4 differs in that it has built-in opening means and/or support means 22 associated with the beverage outlet wall 10 and a beverage dispensing duct 23 extending from the cup-shaped body 6. The beverage outlet wall 10 can be a foil which opens by effect of the pressure of liquid building in the cavity or can be a filter layer or a combination of both. The opening and/or supporting means 22 may have raised elements 25 and channels 26 for guiding and/or collecting beverage to the duct 23.

The body is also closed by a liquid inlet wall 7 which can be a flexible membrane sealed onto an upper flange 24 of the body. In a possible variant, the chamber (thereby forming the "interior cavity") containing the beverage precursor can be reduced by the presence of a flow distributor (e.g., apertured wall) positioned between the liquid inlet wall and the beverage precursor as described in WO 2006/021405.

In this capsule, the beverage precursor 3 also comprises a combination of beverage extractable pellets 4 and non-compacted beverage extractable powder 5. The pellets are preferably all gathered close to the inlet wall. The pellets can be placed between the inlet wall 7 and a lower internal filter wall or, a flow distributor as described in WO 2006/021405, or in a filter gusset or bag (not shown). The pellets can alternatively be confined against the non-compacted powder by a flow distributor such as one as described in WO 2006/021405.

The beverage precursor in capsule 1 C can be the same as in capsule 1A.

In another mode, at least some, preferably a majority of, most preferably essentially all pellets are made of a first beverage precursor and a part, preferably a major part of, most preferably the full non-compacted beverage extractable powder is made of a second beverage precursor which is different from the first beverage precursor. In particular, the first beverage precursor can be essentially (dairy or vegetable) milk powder and/or instant coffee, and/or, cocoa or chocolate powder, and/or carbohydrate such as sucrose and the second beverage precursor is roast-and-ground coffee powder. In a variant, the first beverage precursor is roast-and-ground powder and the second beverage precursor is (dairy or vegetable) milk powder and/or instant coffee and/or carbohydrate such as sucrose.

The combination of roast-and-ground coffee pellets with sucrose powder (e.g. 75 wt. % to 25 wt. %) provided a faster extraction compared to same without pellets (e.g. 75 wt. % loose roast-and-ground-coffee and 25 wt. % sucrose powder). Furthermore, a combination of sucrose pellets and roast-and-ground coffee powder (e.g., 25 wt. % to 75 wt. %) also shown a faster extraction. Furthermore, the pellets of sucrose compacted at 10 kN/cm$^2$ were easily dissolved during extraction.

Figure 5:
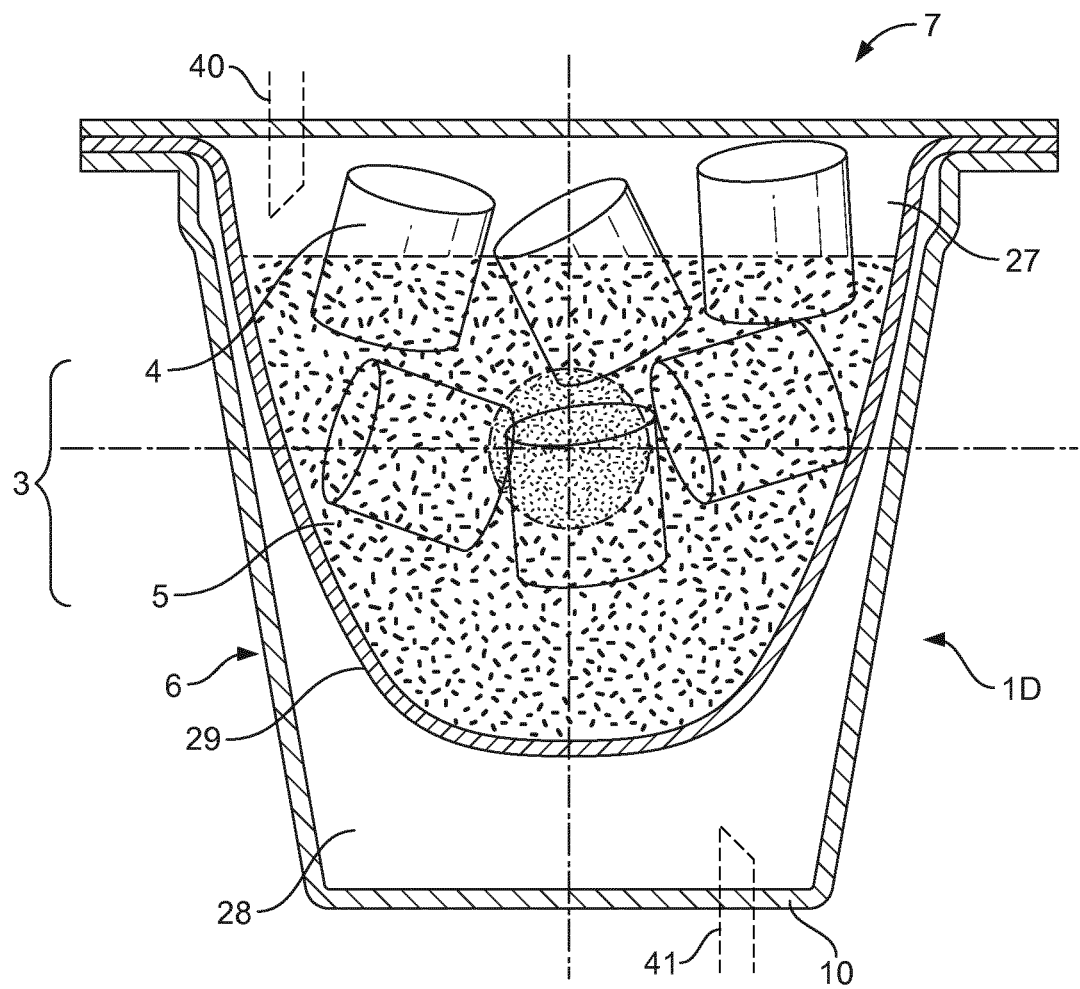
FIG. 5 shows a cross-section of a fourth possible mode of a capsule of the invention, in particular, with a cup-shaped body, a liquid injection wall sealed thereon and an inside filter for demarcating in the cavity a first chamber for the beverage precursor and a second chamber for beverage collection; such capsule being adapted to produce a beverage in a (e.g., "Keurig®"-branded) beverage machine.

The capsule 1D of FIG. 5 represents another possible solution of the invention in which the cavity is separated by a separating filter 29 in a first chamber 27 (thereby forming the "interior cavity") and a second chamber 28. The first chamber is demarcated by the liquid inlet wall 7 and the separating filter 29. The second chamber is demarcated by the separating filter and the body 6 of the capsule comprising the beverage outlet wall 10. The beverage precursor may be positioned in the first chamber 27 (as shown) or in the second chamber 27 or be shared between the first and second chambers 27, 28 (thereby forming the "interior cavity"). For example, first chamber 27 can house the pellets 4 (or at least a majority of pellets) and the second chamber 28 can house non-compacted extractable powder (or at least a major amount of it or full of it).

The beverage precursor in capsule 1D can be the same as in capsule 1C.

The preparation of the beverage in the capsule 1D can be performed in a system of a beverage machine such as described U.S. Pat. No. 5,840,189. The liquid inlet wall 7 is perforated by a liquid injection probe 40 (in dotted line) which injects liquid, e.g., hot water, in the cavity and the beverage outlet wall 10 is perforated by a beverage outlet probe 41 (in dotted line) which collects the beverage out of the cavity, in particular, out of the chamber 28. The beverage system generally provide a lower liquid pressure range during beverage extraction than the previously described systems (e.g. 1-5 bar compared to 5-20 bar). However, the liquid pressure is also dependent on the beverage precursor (type, amount of precursor, degree of confinement) in the capsule and of the type of liquid pump utilized.

Figure 6:
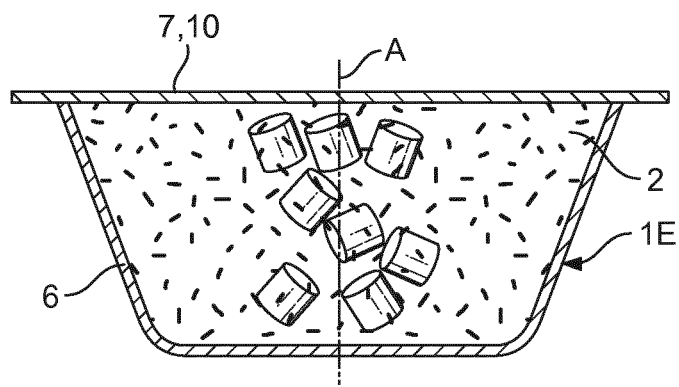
FIG. 6 shows a cross-section of a fifth possible mode of a capsule of the invention, in particular, a cup-shaped body with a liquid inlet and beverage outlet wall sealed on the flange of the body; such capsule being adapted to produce a beverage by rotating the capsule around its central axis of symmetry (A) and by extracting by forces of centrifugation the beverage at the periphery of the beverage outlet wall.
Figure 7:
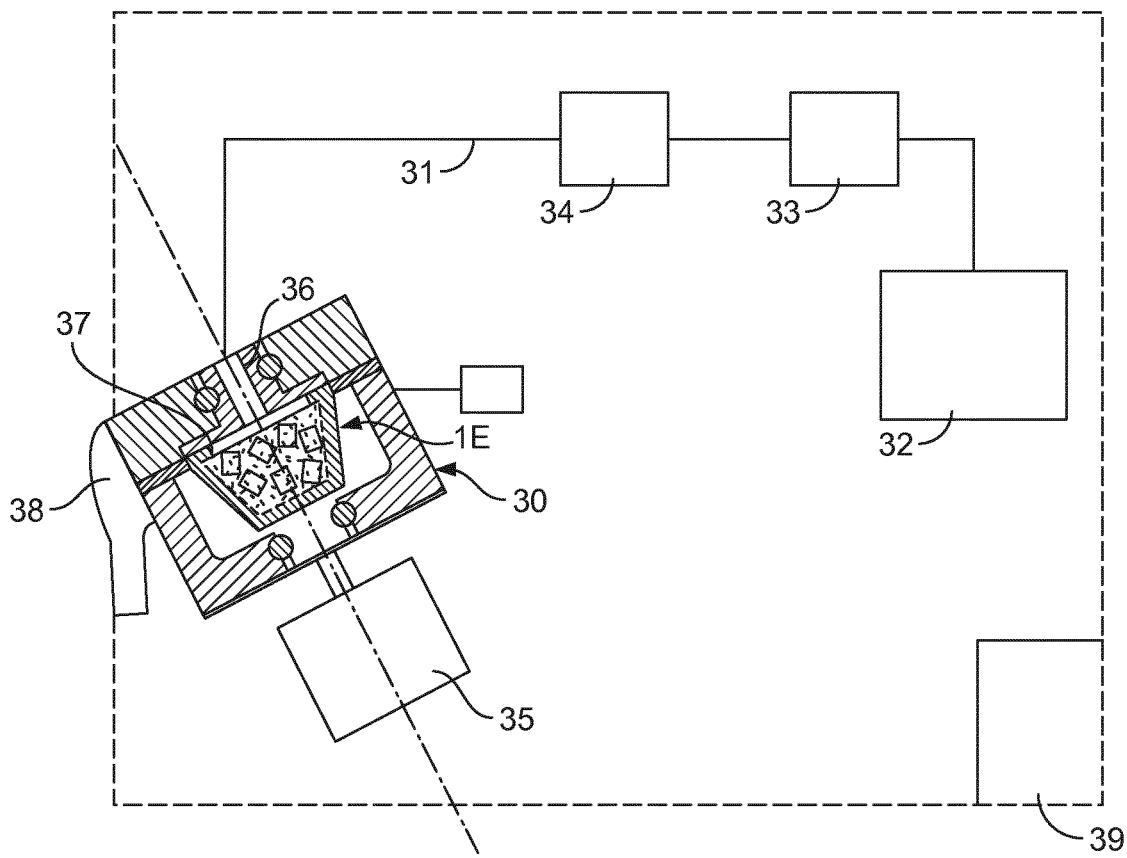
FIG. 7 shows a schematic view of system with the capsule of FIG. 6 and a centrifugal extraction device.

The capsule 1E of FIG. 6 can be utilized in a centrifugation beverage extraction system as illustrated in FIG. 7. The capsule 1E comprises a cup-shaped body 6 and a lid that can be sealed onto the flange of the body and which forms the liquid inlet and beverage outlet wall 7, 10. The body and lid demarcate a cavity receiving the beverage precursor. In this embodiment, the pellets 4 can, for instance, be placed differently than in the previous capsules. In a possible mode the pellets 4 are positioned closer to the axis of symmetry or central axis A of the capsule than to the peripheral region of the cavity. The lid can be a closed perforable foil or a foil comprising pre-openings such as a multitude of peripheral orifices for extraction of the beverage by centrifugation such as described in WO 2008/148601. The lid can also comprise a peripheral valve means opening one or more beverage outlets under the force of centrifugation as also described in WO 2008/148601.

The beverage precursor can be the same as in capsule 1A or in capsule 1C.

The centrifugation extraction system for preparing a beverage from a capsule 1E is illustrated schematically in FIG. 7. It comprises a centrifugal extraction unit 30 for receiving the capsule 1E, a fluid circuit 31 for supplying liquid in the capsule, comprising a liquid (water) reservoir 32, a pump 33 and a heater 34. The centrifugal extraction unit is driven in centrifugation by a rotary motor 35. The centrifugal extraction unit comprises liquid supply means 36 for feeding liquid in the centre of the capsule and beverage extraction means 37 such as a series of small circumferential perforating means such as needles for extracting beverage from the capsule and collecting means 38 for collecting the beverage and dispensing it to a receptacle. A control unit 39 is also provided to control 'inter alia' the motor and rotation speed of the extraction unit, the liquid temperature and the flow rate of the pump. The device is further described in WO 2008/148601.

1. Comparative Extraction Results without Pellets and with Pellets 1.1. General Conditions A comparative extraction study was performed to compare the extraction results for capsules containing no pellets, capsules containing 100 wt. % roast-and-ground coffee pellets and capsules containing a combination of roast-and-ground coffee pellets and roast-and-ground non-compacted coffee powder. The capsule was a Nespresso® capsule (as illustrated in FIG. 1) of standard size (cavity's volume of 14.5 ml) with an aluminium foil of 30-μm thickness. The roast-and-ground coffee was 100% Arabica coffee quality of Ethiopia. The coffee extractions were performed in a Nespresso Inissia™ coffee machine (hot water in range of 85-92° C.).

For the trials with pellets in the capsules, the pellets were produced in Medel'Pharm Styl'One laboratory press. The tool used for producing the pellets allows the production of 8 pellets at once, with a diameter of 4 mm for each pellet. The compaction pressure applied on the powder was of 20 kN/cm$^2$. The trials were made with coffee powder at two different particle sizes, $D_{4,3}$ of 240 μm (hereafter called "fine powder") and $D_{4,3}$ of 600 μm (hereafter called "coarse powder"). The density and height of the pellets could be determined for each particle size at the corresponding compaction pressure as described later in "4. Characterization of density and of pellets".

1.2. Coffee Extractions from Capsules without Pellets

Without pellets, it was possible to fill and seal the capsule with 7.5 g maximum of fine powder and up to 6.6 g of coarse powder. The following results on flow-time were reported. For many trials (high coffee loads), the machine could not deliver the desired amount of coffee extract due to a too low measured flow rate and the pump was stopped to avoid damage to the machine. The results on flow time for these trials are referred as "stopped".

| $D_{4,3}$ = 600 μm | Flow time [s] for each extract weight | | |
|---|---|---|---|
| Weight R&G [g] | 40 g | 110 g | 230 g |
| 6.3 | 20 | 58 | 125 |
| 6.4 | 28 | 79 | 178 |
| 6.5 | 53 | Stopped | Stopped |
| 6.6 | 33 | 105 | Stopped |

| D4,3 = 240 μm | Flow time [s] for each extract weight | | |
|---|---|---|---|
| Weight R&G [g] | 25 g | 40 g | 110 g |
| 6.2 | 46 | 75 | Stopped |
| 6.4 | Stopped | Stopped | Stopped |
| 6.6 | Stopped | Stopped | Stopped |
| 7 | Stopped | Stopped | Stopped |
| 7.5 | Stopped | Stopped | Stopped |

The following additional results on $T_c$, Yield, flow time and flow rate were obtained for variants without pellets and two different coffee weights, 5.0 and 6.0 g respectively, and for fine powder size. Coffee extracts of 25 to 230 ml were targeted.

| 157825.0001 | | | Eth. Ref no pellets 240 μm R&G 5 g NN Cap | | | |
|---|---|---|---|---|---|---|
| Caps. # | Extr target [g] | Weight R&G [g] | FT [s] | Weight extr [g] | TC refracto [%] | Yield [%] | Flow rate [g/min] |
| 1 | 25 | 5.0 | 24.9 | 26.2 | 3.6 | 18.7 | 63.0 |
| 2 | 25 | 5.0 | 18.3 | 27.2 | 3.2 | 17.2 | 89.0 |
| 3 | 40 | 5.0 | 27.9 | 41.4 | 2.5 | 21.0 | 89.0 |
| 4 | 40 | 5.0 | 45.7 | 40.9 | 2.9 | 23.8 | 53.7 |
| 5 | 110 | 5.0 | 71.5 | 111.7 | 1.1 | 25.4 | 93.6 |
| 6 | 110 | 5.0 | 97.5 | 111.0 | 1.2 | 26.0 | 68.3 |
| 7 | 230 | 5.0 | 232.8 | 231.9 | 0.5 | 23.1 | 59.8 |
| 8 | 230 | 5.0 | 113.6 | 231.9 | 0.5 | 24.5 | 122.5 |

| 157825.0002 | | | Eth. Ref no pellets 240 μm R&G 6 g NN Cap | | | |
|---|---|---|---|---|---|---|
| Caps. # | Extr target [g] | Weight R&G [g] | FT [s] | Weight extr [g] | TC refracto [%] | Yield [%] | Flow rate [g/min] |
| 1 | 25 | 6.0 | 51.3 | 26.2 | 5.9 | 25.5 | 30.6 |
| 2 | 25 | 6.0 | 36.5 | 26.6 | 5.9 | 26.1 | 43.7 |
| 3 | 40 | 6.0 | 57.9 | 41.1 | 3.9 | 26.4 | 42.5 |
| 4 | 40 | 6.0 | | | Stopped | | |
| 5 | 110 | 6.0 | 150.6 | 110.9 | 1.6 | 29.4 | 44.2 |
| 6 | 110 | 6.0 | | | Stopped | | |
| 7 | 230 | 6.0 | | | Stopped | | |
| 8 | 230 | 6.0 | | | Stopped | | |

For coarse powder size without pellets, and three different coffee weights, 5.0, 6.0 and 6.4 g respectively, the following results were obtained. Coffee extracts of 25 to 230 ml were targeted.

| 157825.0004 | | | Eth. Ref no pellets 600 μm R&G 5 g NN Cap | | | |
|---|---|---|---|---|---|---|
| Caps. # | Extr target [g] | Weight R&G [g] | FT [s] | Weight extr [g] | TC refracto [%] | Yield [%] | Flow rate [g/min] |
| 1 | 25 | 5.0 | 11.7 | 26.6 | 2.8 | 14.7 | 136.4 |
| 2 | 25 | 5.0 | 10.7 | 28.1 | 2.6 | 14.8 | 157.7 |
| 3 | 40 | 5.0 | 13.7 | 41.7 | 1.9 | 15.9 | 181.7 |
| 4 | 40 | 5.0 | 8.1 | 43.9 | 1.7 | 14.5 | 323.0 |
| 5 | 110 | 5.0 | 108.1 | 110.5 | 1.0 | 22.3 | 61.3 |
| 6 | 110 | 5.0 | 58.9 | 112.6 | 0.9 | 20.8 | 114.7 |
| 7 | 230 | 5.0 | 89.8 | 231.9 | 0.4 | 20.4 | 154.9 |
| 8 | 230 | 5.0 | 76.2 | 233.8 | 0.4 | 20.1 | 184.1 |

| 157825.0005 | | | Eth. Ref no pellets 600 μm R&G 6 g NN Cap | | | |
|---|---|---|---|---|---|---|
| Caps. # | Extr target [g] | Weight R&G [g] | FT [s] | Weight extr [g] | TC refracto [%] | Yield [%] | Flow rate [g/min] |
| 1 | 25 | 6.0 | 5.6 | 30.0 | 2.7 | 13.3 | 318.8 |
| 2 | 25 | 6.0 | 5.1 | 28.8 | 2.8 | 13.7 | 339.3 |
| 3 | 40 | 6.0 | 18.8 | 42.0 | 2.5 | 17.4 | 134.2 |
| 4 | 40 | 6.0 | 23.8 | 41.4 | 2.6 | 18.2 | 104.2 |
| 5 | 110 | 6.0 | 56.3 | 111.8 | 1.1 | 21.2 | 119.1 |
| 6 | 110 | 6.0 | 59.4 | 111.7 | 1.1 | 21.2 | 112.9 |
| 7 | 230 | 6.0 | 138.5 | 231.9 | 0.6 | 22.0 | 100.4 |
| 8 | 230 | 6.0 | 87.8 | 232.8 | 0.5 | 21.0 | 159.0 |

| 157825.0006 | | | Eth. Ref no pellets 600 μm R&G max weight NN Cap | | | |
|---|---|---|---|---|---|---|
| Caps. # | Extr target [g] | Weight R&G [g] | FT [s] | Weight extr [g] | TC refracto [%] | Yield [%] | Flow rate [g/min] |
| 1 | 25 | 6.4 | 12.7 | 26.8 | 3.7 | 15.4 | 126.3 |
| 2 | 25 | 6.4 | 5.6 | 31.3 | 2.9 | 14.0 | 335.7 |
| 3 | 40 | 6.4 | 10.6 | 43.4 | 2.3 | 15.7 | 244.7 |
| 4 | 40 | 6.4 | 22.3 | 41.8 | 2.8 | 18.3 | 112.2 |
| 5 | 110 | 6.4 | 61.9 | 111.5 | 1.2 | 21.4 | 108.1 |
| 6 | 110 | 6.4 | 122.8 | 110.9 | 1.3 | 22.9 | 54.2 |
| 7 | 230 | 6.4 | 136.9 | 232.0 | 0.6 | 21.4 | 101.6 |
| 8 | 230 | 6.4 | 56.3 | 233.9 | 0.5 | 19.7 | 249.1 |

1.3. Coffee Extractions from Capsules with 100 wt. % of Pellets

Trials were run with capsules containing only roast-and-ground coffee pellets with coarse powder. It was possible to fill and seal 9 g maximum of coffee powder. Coffee extracts of 25 to 230 ml were targeted. The extraction results are given in the table below.

| | | | Eth. 9.0 g/100%/F/600 μm p./20 kN | | |
|---|---|---|---|---|---|
| Caps. # | 160383.0002 Extr target [g] | Weight R&G [g] | FT [s] | Weight extr [g] | TC refracto [%] | Yield [%] |
| 1 | 25 | 9.0 | 41.6 | 26.4 | 1.8 | 5.4 |
| 2 | 25 | 9.0 | 31.9 | 26.1 | 2.0 | 5.7 |
| 3 | 40 | 9.0 | 53.8 | 41.2 | 1.4 | 6.3 |
| 4 | 40 | 9.0 | 48.2 | 41.5 | 1.6 | 7.2 |

| | Eth. 9.0 g/100%/F/600 μm p./20 kN | | | | | |
|---|---|---|---|---|---|---|
| Caps. # | 160383.0002 Extr target [g] | Weight R&G [g] | FT [s] | Weight extr [g] | TC refracto [%] | Yield [%] |
| 5 | 110 | 9.0 | 147.1 | 111.1 | 1.0 | 11.7 |
| 6 | 110 | 9.1 | 146.6 | 111.3 | 0.9 | 11.4 |
| 7 | 230 | 9.0 | 252.1 | 231.9 | 0.6 | 14.5 |
| 8 | 230 | 9.0 | 245.3 | 231.4 | 0.5 | 12.1 |

The results with coarse powder show that the total solid content and the extraction yield are very low showing that an inefficient coffee extraction occurs.

With pellets made from fine powder, it was possible to fill and seal capsules containing up to 10 g of roast-and-ground (100 wt. % pellet), but no extraction was possible because the flow was too low and the machine was stopped. For variants with 9 g of roast-and-ground coffee in similar conditions, the flow was also too low and the machine was stopped.

1.4. Coffee Extractions from Capsules with Combination of Pellets and Non-Compacted Powder Capsules were prepared with a blend of 75 wt. % of coffee pellets (coarse powder) and 25 wt. % of non-compacted roast-and-ground coffee powder (fine powder). The extraction results on $T_c$ and Yield are given in the table below.

| | Eth. 9.0 g/75%/F/600 μm p./20 kN/240 μm R&G | | | | | |
|---|---|---|---|---|---|---|
| Caps. # | 160383.0001 Extr target [g] | Weight R&G [g] | FT [s] | Weight extr [g] | TC refracto [%] | Yield [%] |
| 1 | 25 | 9.0 | 29.5 | 26.2 | 3.2 | 9.1 |
| 2 | 25 | 9.0 | 33.0 | #N/A | 3.9 | #N/A |

| | Eth. 9.0 g/75%/F/600 μm p./20 kN/240 μm R&G | | | | | |
|---|---|---|---|---|---|---|
| Caps. # | 160383.0001 Extr target [g] | Weight R&G [g] | FT [s] | Weight extr [g] | TC refracto [%] | Yield [%] |
| 3 | 40 | 9.0 | 42.1 | 41.0 | 2.5 | 11.2 |
| 4 | 40 | 9.0 | 41.6 | 41.1 | 2.5 | 11.2 |
| 5 | 110 | 9.0 | 112.6 | 110.9 | 1.3 | 15.4 |
| 6 | 110 | 9.0 | 106.0 | 111.0 | 1.3 | 16.4 |
| 7 | 230 | 9.0 | 383.1 | 231.2 | 0.7 | 16.7 |
| 8 | 230 | 9.0 | 321.3 | 232.7 | 0.7 | 17.6 |

(#N/A: spilled sample before possible measure)

As can be seen in those two tables, the extraction yields increase with the cup size. All coffee extract sizes (25-230 g) could be successfully dispensed without stopping issues. A delay of extraction could be noticed with a low coffee yield for short coffee extracts but yield increasing progressively towards the long coffee extracts.

Additional tests were run at two different coffee weights, 6.2 and 8 g, and two different particle sizes of coffee powder for coffee pellets, respectively, 300 and 500 μm, with a compaction pressure of 20 KN/cm$^2$ and two different particle sizes, respectively 300 and 500 μm, for non-compacted roast-and-ground coffee powder.

The average extraction yield and average flow time for delivering 110 g of coffee extract were determined on 15 coffee cups.

Better results were obtained with a position of pellets against the liquid inlet wall than with a position of pellets against the outlet wall (tear foil). The optimal conditions of yield and flow time were obtained with a total weight of coffee of 8 g, a small particle size (300 μm) and a position of the pellets against the liquid inlet wall. Too long flow times were observed when the pellets were placed against the beverage outlet wall.

The results are compiled in the following table.

| Total weight of coffee in capsule [g] | Coffee Particle size $D_{4,3}$ for pellets | Position of pellets in capsule | pellets [wt. %] | Coffee Particle size $D_{4,3}$ for non-compacted powder | Average yield [wt. %] | Average flow time [seconds] |
|---|---|---|---|---|---|---|
| 6.2 | 300 | Inlet side | 75 | 300 | 21.5 | 51.8 |
| 6.2 | 300 | Inlet side | 50 | 500 | 21.2 | 37.3 |
| 6.2 | 300 | Inlet side | 50 | 300 | 22.9 | 46.2 |
| 6.2 | 300 | Inlet side | 75 | 500 | 19.7 | 49.3 |
| 6.2 | 500 | Inlet side | 50 | 300 | 21.8 | 40.3 |
| 6.2 | 500 | Inlet side | 75 | 500 | 18.4 | 46.6 |
| 6.2 | 500 | Inlet side | 75 | 300 | 20.7 | 51.8 |
| 6.2 | 500 | Inlet side | 50 | 500 | 20.1 | 39.6 |
| 8 | 300 | Inlet side | 50 | 300 | 24.2 | 84.3 |
| 8 | 300 | Inlet side | 75 | 500 | 22.6 | 77.7 |
| 8 | 300 | Inlet side | 75 | 300 | 23.3 | 73.8 |
| 8 | 300 | Inlet side | 50 | 500 | 23.0 | 106.4 |
| 8 | 500 | Inlet side | 75 | 300 | 18.4 | 49.0 |
| 8 | 500 | Inlet side | 50 | 500 | 19.0 | 49.8 |
| 8 | 500 | Inlet side | 50 | 300 | 21.3 | 53.0 |
| 8 | 500 | Inlet side | 75 | 500 | 17.0 | 45.5 |
| 6.2 | 300 | Outlet side | 50 | 300 | 19.5 | 63.1 |
| 6.2 | 300 | Outlet side | 75 | 500 | 19.4 | 57.8 |
| 6.2 | 300 | Outlet side | 75 | 300 | 21.2 | 61.4 |
| 6.2 | 300 | Outlet side | 50 | 500 | 16.4 | 65.5 |
| 6.2 | 500 | Outlet side | 75 | 300 | 20.4 | 55.8 |
| 6.2 | 500 | Outlet side | 50 | 500 | 15.4 | 61.0 |
| 6.2 | 500 | Outlet side | 50 | 300 | 19.1 | 64.4 |

-continued

| Total weight of coffee in capsule [g] | Coffee Particle size $D_{4,3}$ for pellets | Position of pellets in capsule | pellets [wt. %] | Coffee Particle size $D_{4,3}$ for non-compacted powder | Average yield [wt. %] | Average flow time [seconds] |
|---|---|---|---|---|---|---|
| 6.2 | 500 | Outlet side | 75 | 500 | 17.6 | 51.5 |
| 8 | 300 | Outlet side | 75 | 300 | 17.8 | 100.3 |
| 8 | 300 | Outlet side | 50 | 500 | 18.1 | 181.4 |
| 8 | 300 | Outlet side | 50 | 300 | 19.1 | 154.8 |
| 8 | 300 | Outlet side | 75 | 500 | 16.4 | 125.9 |
| 8 | 500 | Outlet side | 50 | 300 | 16.5 | 154.6 |
| 8 | 500 | Outlet side | 75 | 500 | 12.2 | 106.5 |
| 8 | 500 | Outlet side | 75 | 300 | 15.3 | 92.2 |
| 8 | 500 | Outlet side | 50 | 500 | 16.9 | 148.3 |

2. Comparative Coffee Extraction Results and Extraction Kinetics with and without Pellets at Different Particle Sizes The same conditions of tests described in 1.1 "General Conditions" were performed in this second study except for the compaction pressure and the particle sizes that were modified.

A single capsule was extracted into different receptacles, by instantaneously switching from one receptacle to the next one without stopping extraction in the coffee machine. This allowed to measure the kinetics at which the soluble matter is extracted from the capsule, during extraction of a whole cup. After extraction of the total desired amount of extract, each container was weighted and the total solid content ($T_c$) was also measured. The extraction yield was also determined. This allowed to compute the total mass of soluble matter in each fraction of the extraction, and to compare the kinetics of extraction for different trials.

The comparison study between capsule without pellets ("References") and capsules with a combination of pellets and non-compacted coffee powder ("Invention") was made with same roast-and-ground coffee of Ethiopian coffee quality.

For the references, the finest particle size showed the faster extraction of soluble matter, while the largest particle size provided to the slowest extraction kinetics.

For the two variants containing pellets, the curve of $T_c$ in the cumulated cup size is clearly different from the references. The $T_c$ initially increases for the first 15 g of coffee extract, before starting to decrease. When it decreases, the $T_c$ is higher than the references without pellets, even the reference with a particle size $D_{4,3}$ of 500 µm.

Figure 21:
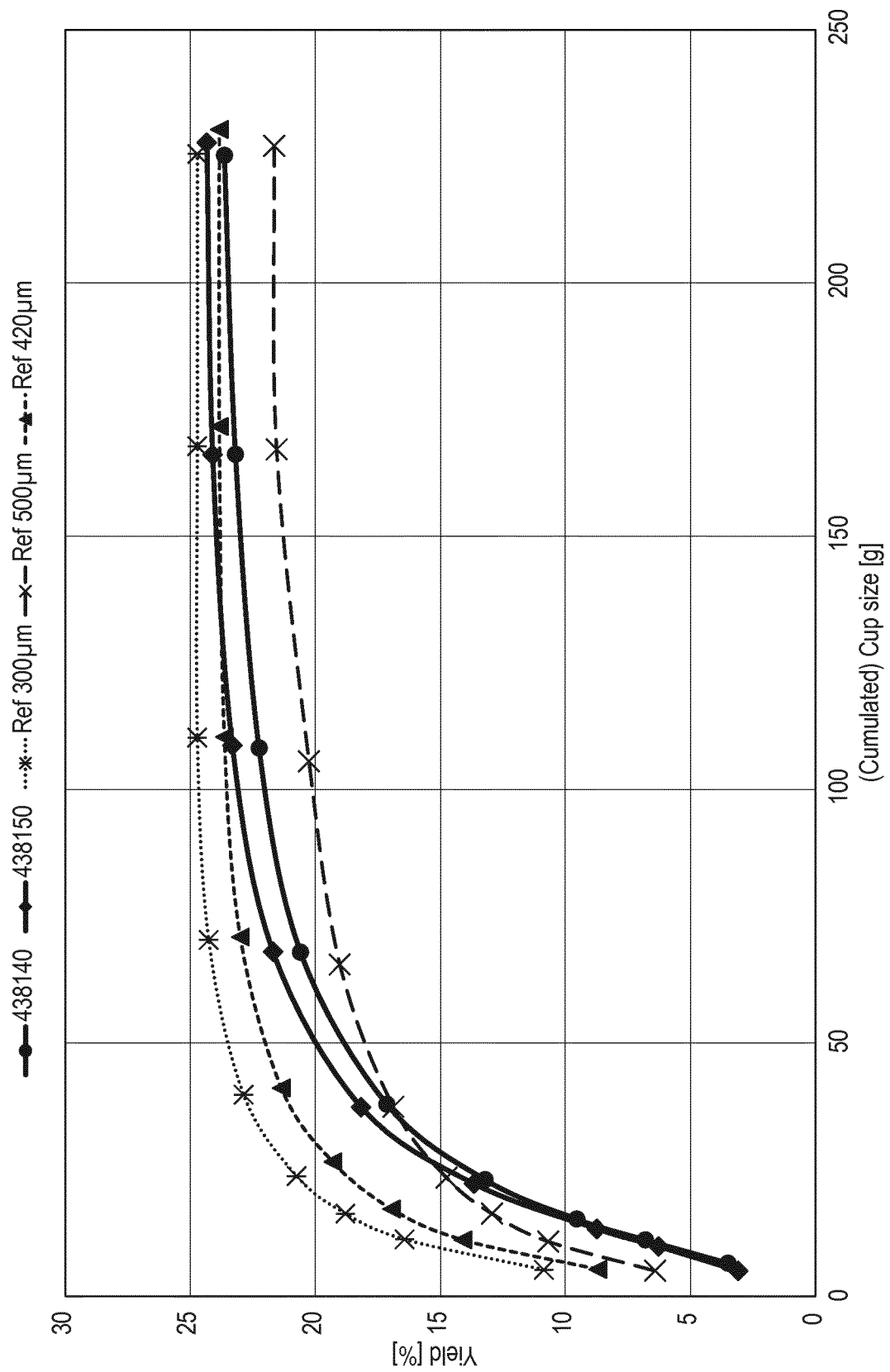
FIG. 21 is a graphic of comparative coffee examples giving the yield as function of the cumulated cup size ("Yield kinetics")

The evolution of the extraction yield as a function of the cup size is represented in the graphic of FIG. 21 and shows a delayed extraction of the capsules with pellets compared to the references.

3. Kinetics of Aroma Extraction

The in-cup aroma extraction kinetics were determined for one highly polar odorant (2,3-butanedione), one medium polar odorant (2,3,5-trimethylpyrazine) and one low polar odorant (4-ethylguaiacol). For each odorant, the results are expressed as the in-cup quantities of odorant normalized between 0 to 1 for coffee extracts between 0 and 230-ml.

The extraction kinetics for 2,3-butanedione showed a clear delay in extraction kinetics for the samples containing

| 110 g cup size | References | | | Invention | | | |
|---|---|---|---|---|---|---|---|
| | 300 µm | 420 µm | 500 µm | 438140 | 438150 | 438151 | 438161 |
| Total weight of coffee in capsule [g] | 6.1 | 6.2 | 6.2 | 8 | 8 | 6.2 | 6.2 |
| wt. % of pellets | 0 | 0 | 0 | 75 | 75 | 50 | 50 |
| $D_{4,3}$ for pellets [µm] | — | — | — | 300 | 300 | 300 | 500 |
| Position of pellets in capsule | — | — | — | Inlet | Inlet | Inlet | Inlet |
| Compaction pressure [kN/cm²] | — | — | — | 20 | 40 | 40 | 20 |
| $D_{4,3}$ for loose coffee [µm] | 300 | 420 | 500 | 500 | 300 | 300 | 300 |
| Flow time [seconds] | 40.5 | 61.3 | 40.0 | 77.7 | 73.5 | 46.2 | 40.3 |
| Tc [wt. %] | 1.3% | 1.3% | 1.2% | 1.6 | 1.7 | 1.3 | 1.2 |
| Yield [wt. %] | 24.3% | 23.4% | 21.1% | 22.6 | 22.3 | 22.9 | 21.8 |

Figure 20:
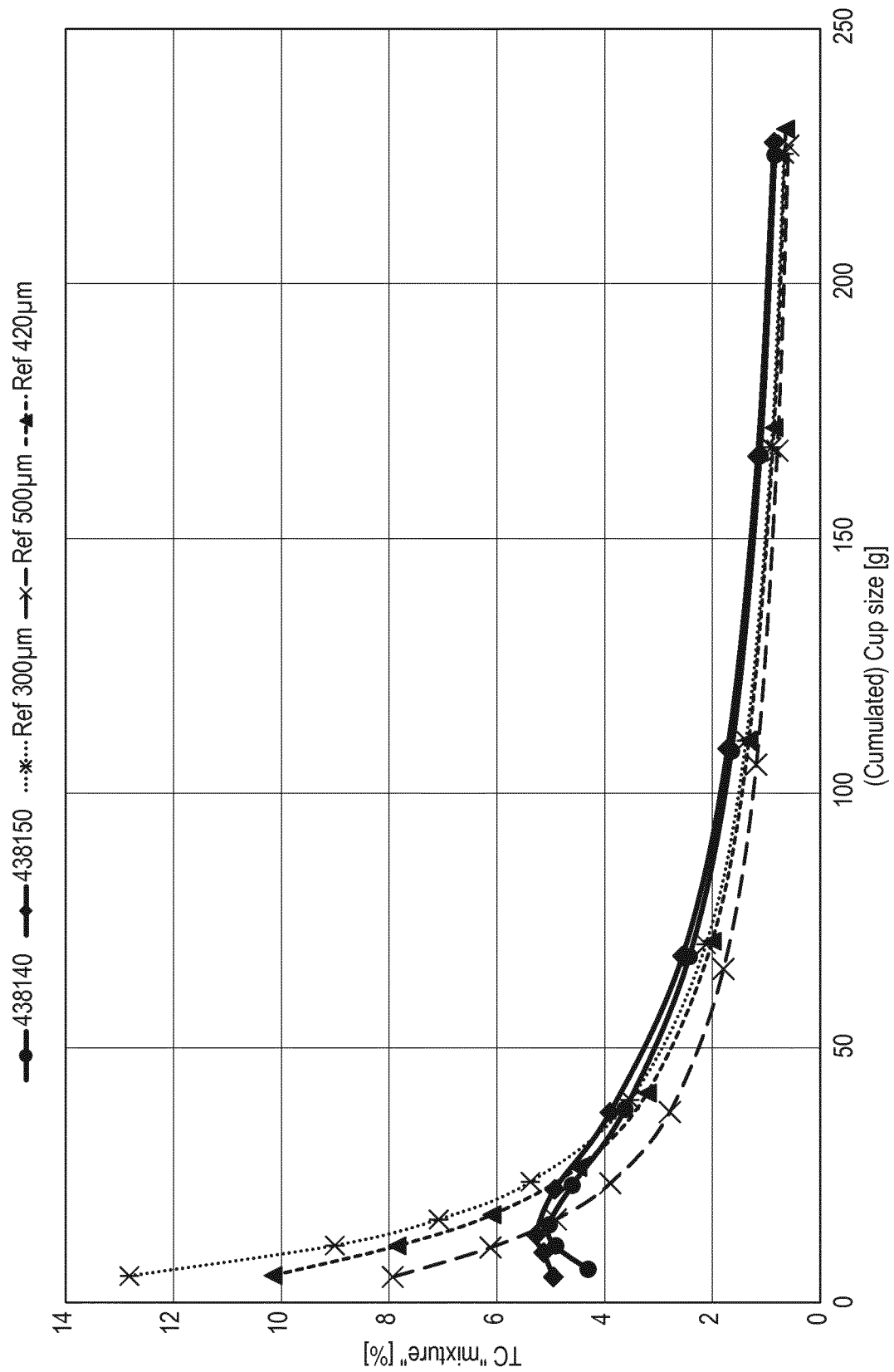
FIG. 20 is a graphic of comparative coffee examples giving the $T_c$ as function of the cumulated cup size ("$T_c$ kinetics")
Figure 22:
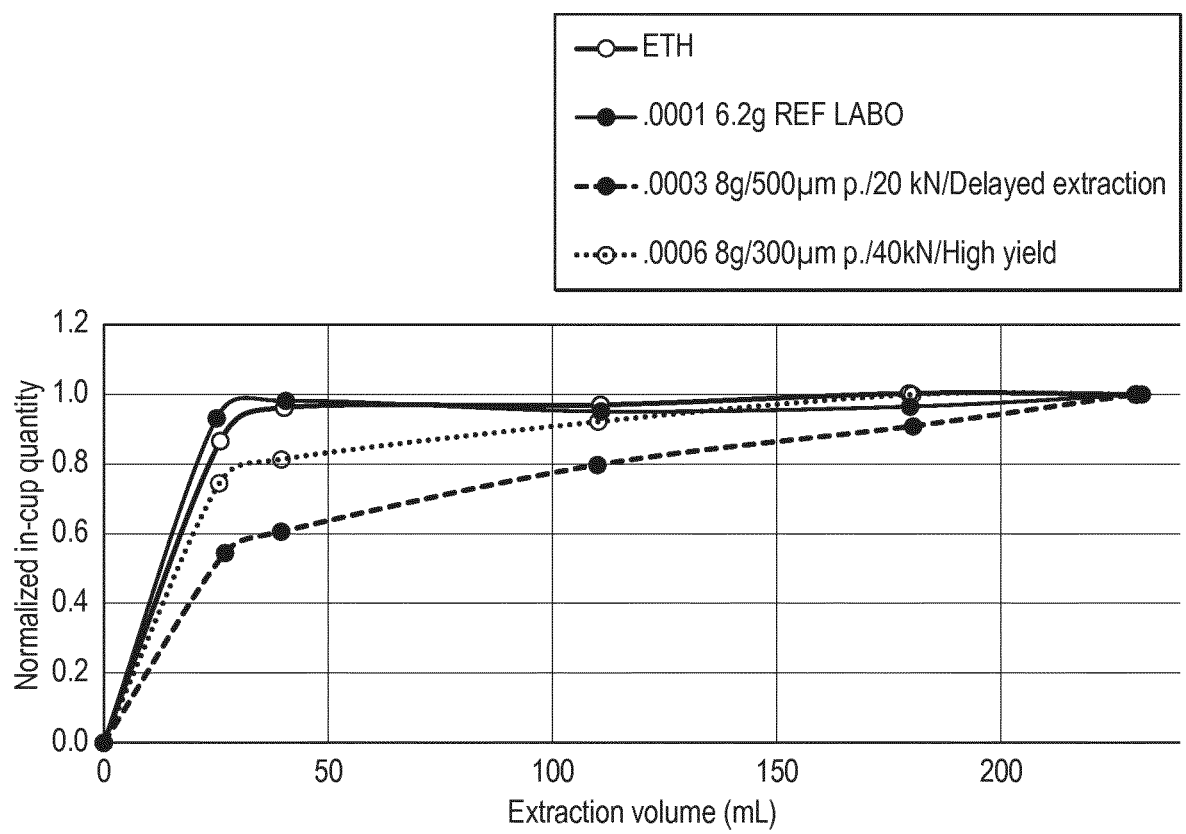
FIG. 22 is a graphic of comparative coffee examples giving the normalized in-cup quantity of high-polar odorant as a function of the extract volume ("High-polar odorant kinetics")

The graphic of FIG. 20 shows different extraction ($T_c$) kinetics that could be obtained with references 438140 and 438150 with 75 wt. % pellets compared to the references.

pellets (References .0003 and .0006) compared to the samples without pellets (ETH, .0001) as illustrated in FIG. 22.

| Trials | Total weight of coffee in capsule [g] | Coffee Particle size $D_{4,3}$ for pellet | Position of pellets in capsule | % of pellets | Coffee Particle size $D_{4,3}$ for non-compacted powder |
|---|---|---|---|---|---|
| ETH | 6.2 | — | — | 0 | 420 |
| .0001 | 6.2 | — | — | 0 | 420 |
| .0003 | 8.0 | 500 | Inlet side | 75 | 300 |
| .0006 | 8.0 | 300 | Inlet side | 75 | 300 |

Figure 23:
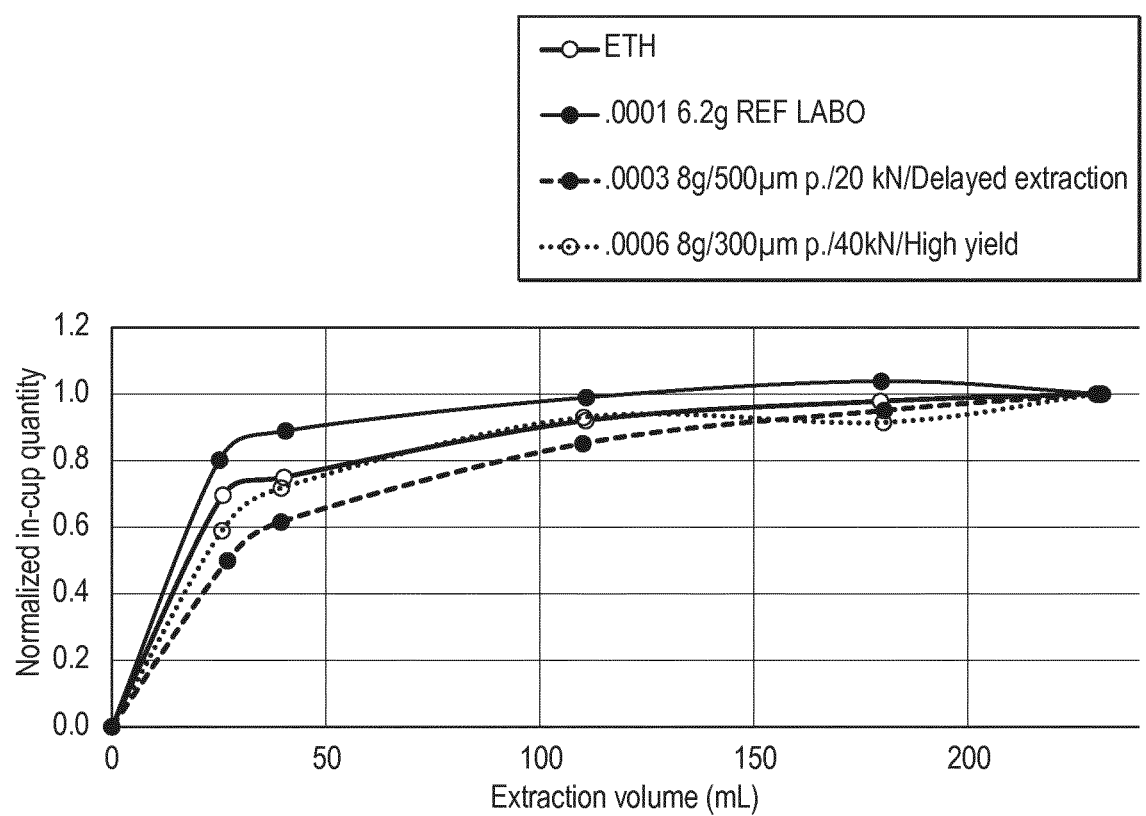
FIG. 23 is a graphic of comparative coffee examples giving the normalized in-cup quantity of medium-polar odorant as a function of the extract volume ("Medium-polar odorant kinetics")
Figure 24:
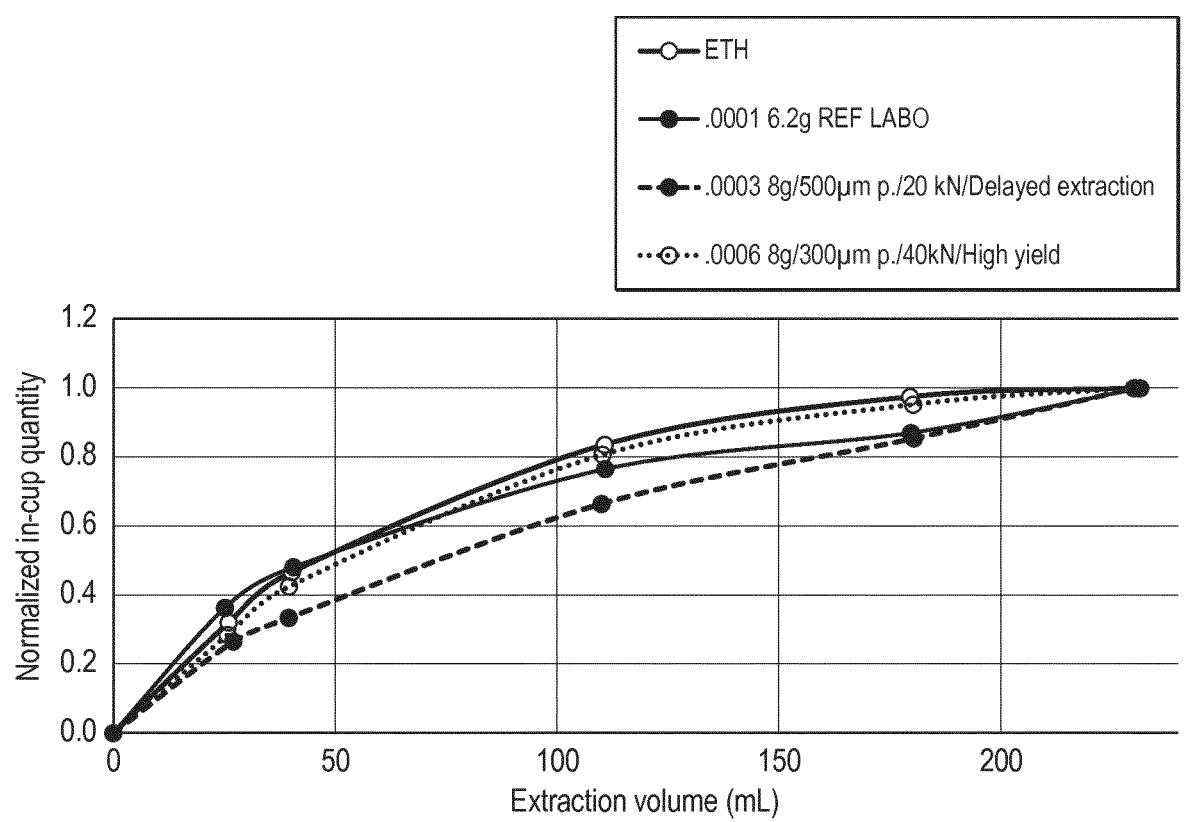
FIG. 24 is a graphic of comparative coffee examples giving the normalized in-cup quantity of low-polar odorant as a function of the extract volume ("Low-polar odorant kinetics")

Likewise for the medium polar odorants, a delay in extraction kinetics was observed for the capsules containing pellets. Sample .0003 consistently showed the highest delay in extraction kinetics as shown in FIG. 23. The in-cup aroma extraction kinetics of the low polar odorants are shown in FIG. 24.

Comparing the aroma kinetics between capsules containing pellets and the reference samples clearly shows a shift/decrease in slopes when pellets are present in the capsules, showing the overall delay in extraction kinetics observed for almost all odorants, but mainly for high and medium polar ones.

4. Characterization of Density and of Pellets

The tested cylindrical pellets with roast-and-ground coffee powders at different particle size were produced in a Medel'Pharm Styl'One laboratory press at respective compaction pressures: 5, 10, 20, 40 kN/cm². 8 pellets of diameter of 4 mm each were produced at once in the press exerting a compaction force.

The envelope density of the pellets was determined for different particle sizes of coffee.

| Density [g/l] Average Diameter $D_{4,3}$ [wt. %] | Compaction force [kN/cm²] | | | |
|---|---|---|---|---|
| | 5 | 10 | 20 | 40 |
| 240 | 820 | 988 | 1053 | 1059 |
| 300 | 800 | 1006 | 1051 | 1072 |
| 500 | 772 | 974 | 1058 | 1065 |
| 600 | 762 | 982 | 1059 | 1071 |

The height (h) in mm of the pellets was determined for different particle sizes of coffee.

| Height [mm] $D_{4,3}$ [wt. %] | Compaction force [kN/cm²] | | | |
|---|---|---|---|---|
| | 5 | 10 | 20 | 40 |
| 240 | 5.6 | 4.6 | 4.3 | 4.2 |
| 300 | 6.1 | 4.9 | 4.5 | 4.5 |
| 500 | 7.4 | 5.7 | 5.4 | 5.2 |
| 600 | 8.0 | 6.2 | 5.7 | 5.5 |

5. Impact of the Shapes for Pellets on Extraction Efficiency

Different shapes of pellets were tested in trial capsules:
Squared parallelepiped (FIGS. 17-19)
Cylinders (FIGS. 8-10)
Thin or large oblong shapes (FIGS. 11-13);

All capsules were filled with 8 g of roast-and-ground coffee. The percentage of pellets was 75 wt. % and the percentage of loose roast-and-ground was of 25 wt. %. The particle size of roast-and-ground coffee for producing the pellets was of 500 μm. The particle size of non-compacted roast-and-ground coffee was of 300 μm.

| Pellets shapes | Compaction Force [kN/cm²] | Flow time | Coffee extract [g] | $T_c$ | Yield |
|---|---|---|---|---|---|
| Cylinder D = 8 mm, h = 16 mm | 23.3 | 49.2 | 29 | 5.9 | 21.3 |
| Squared parallelepiped L = 13 mm, t = 2.6 | 9.6 | 40.7 | 30 | 5.3 | 19.9 |
| Thin oblong L = 10, w = 5, t = 2 | 6.8 | 74.8 | 26.7 | 6.9 | 23.1 |
| Large oblong L = 10, w = 5, t = 4.5 | 6.8 | 52.5 | 32.1 | 5.7 | 22.7 |

The pellets with the smaller characteristic dimensions were extracted more efficiently than the larger ones, in following orders from the most efficient to the less efficient: "Thin oblong", "Large oblong", "Cylinder", "Squared parallelepiped".

6. Impact of Dimensions for Pellets

Two different shapes of pellet were tested in capsules to compare the extraction kinetics; i.e., a sphere (diameter 11.28 mm) and cylinders (diameter of 11.28 and four different heights). A cylindrical pellet is illustrated in FIGS. 8-10. All capsules were filled with 8 g of roast-and-ground coffee. The percentage of pellets was 75 wt. % and the loose roast-and-ground was of 25 wt. %. The particle size of roast-and-ground coffee for producing the pellets was either 300 or 500 μm. The particle size of non-compacted roast-and-ground coffee was of 300 μm.

| Pellets shapes | Height (h) [mm] | Compaction pressure [kN/cm²] | $D_{4,3}$ for pellets [wt. %] | Surface of pellets [mm²] | Density of pellets [Kg/m³] |
|---|---|---|---|---|---|
| Sphere | 11.28 (diameter) | 6 | 300 | 437 | 791 |
| | | 7 | 500 | 445 | 825 |
| Cylinder | 7.27 | 5.9 | 300 | 484 | 790 |
| | 8.28 | 4.7 | 500 | 517 | 752 |
| | 3.41 | 7.8 | 300 | 335 | 845 |
| | 4.04 | 5.0 | 500 | 365 | 754 |

Figure 25:
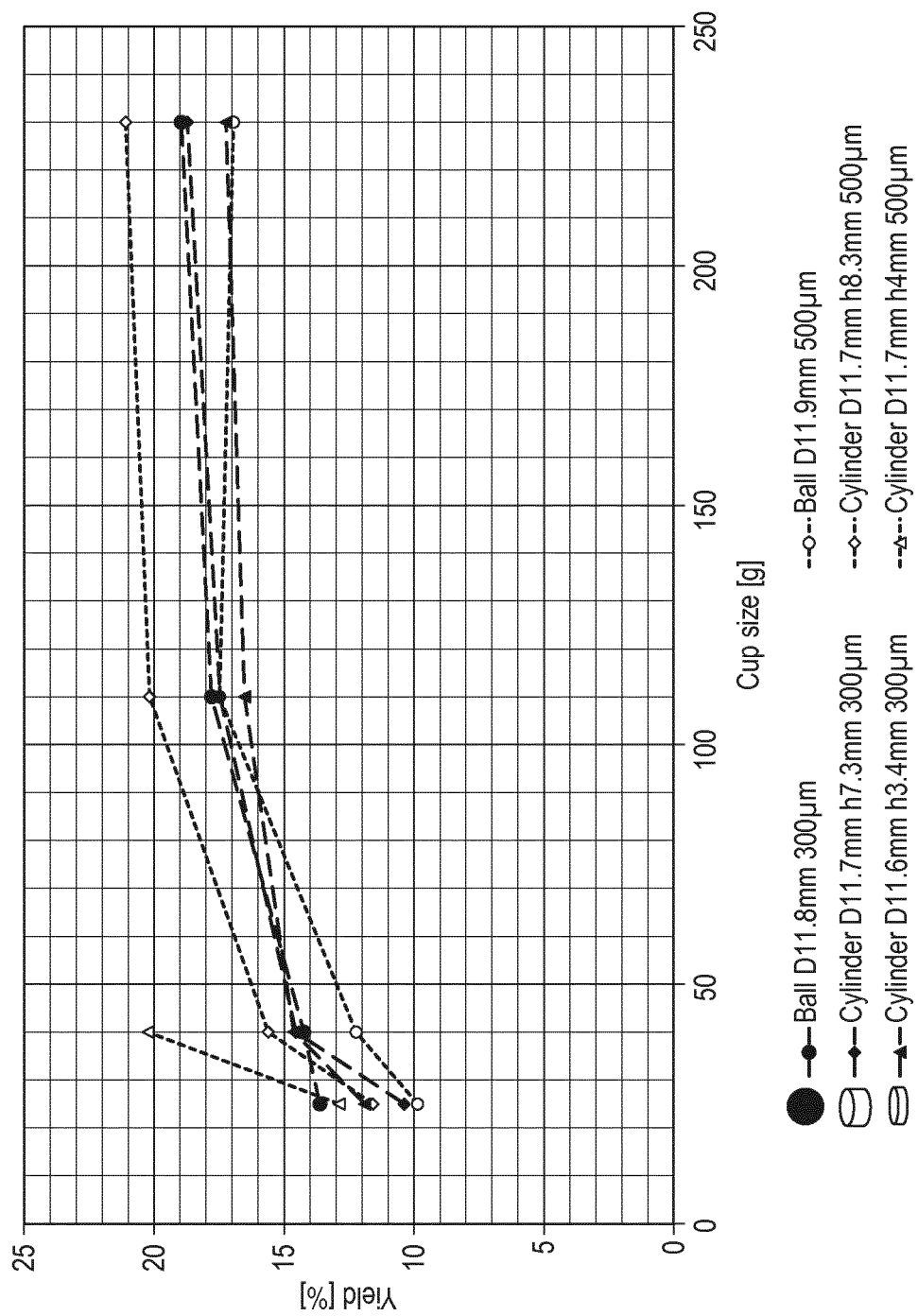
FIG. 25 is a graphic of comparative coffee examples with pellets of different configurations giving the yield as a function of the coffee extract volume or cup size.

The extraction kinetics obtained are illustrated in FIG. 25.

The size of pellets appears more important for a coarse powder than for a finer powder. The less efficient extraction was obtained with the pellets in the form of spheres and coarse particle size. The most efficient configuration was with pellets in short cylinders.

7. Coffee Extraction Kinetics for other Capsules with and without Pellets

Trials on capsules having the configuration of the one illustrated in FIG. 4 were performed. The capsules were Nescafé Dolce Gusto® capsules filled with roast-and-ground coffee as beverage precursor.

The reference capsule ("Ref caps") was the commercial Nescafé Dolce Gusto "Americano" capsule containing 10 g of roast-and-ground coffee powder.

The capsules of the invention were filled with 75 wt. % of pellets and the loose roast-and-ground was of 25 wt. %. The particle size of roast-and-ground coffee for producing the pellets was of 670 μm. The particle size of non-compacted roast-and-ground coffee was of 670 μm. The weight of roast-and-ground coffee was 12.5 g in total.

Figure 26:
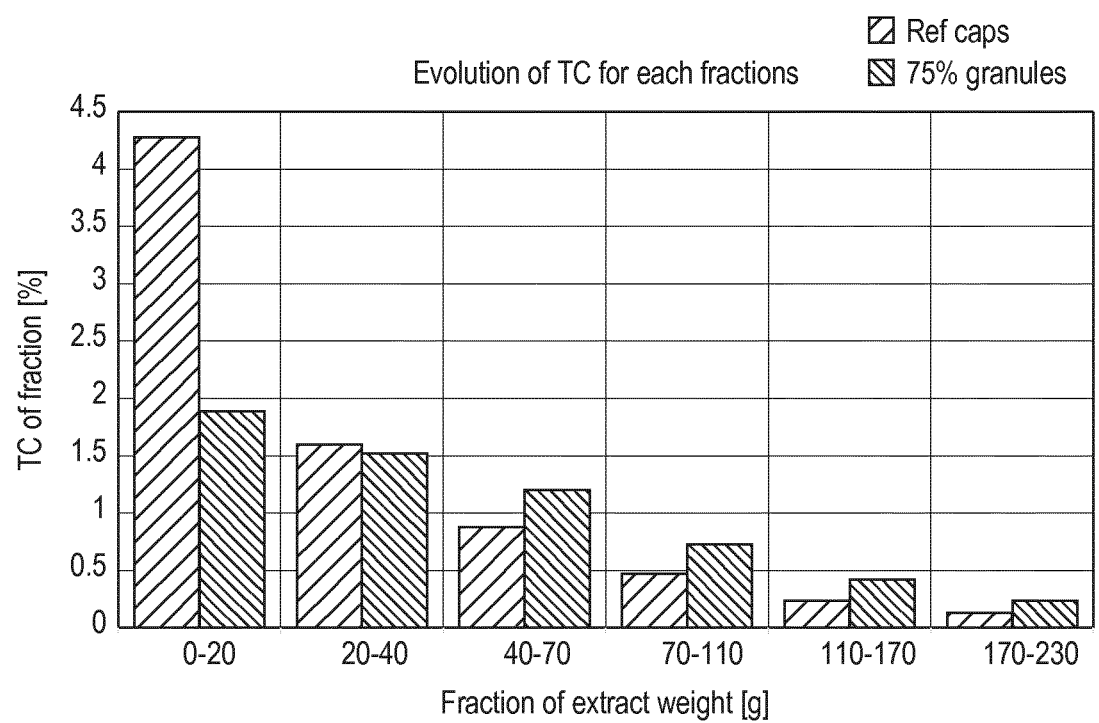
FIG. 26 is a graphic of comparative coffee examples giving the $T_c$ as a function of the fraction of coffee extract in weight ("$T_c$ kinetics")

The graphic of FIG. 26 shows the evolution of the soluble matter extracted by fraction of coffee extract weight.

The results show a slower and more homogeneous coffee solids extraction throughout the whole extraction for the capsules containing pellets. The presence of pellets in the capsule delayed the extraction of the soluble matter.

8. Comparative Trials with a Combination of Compacted Coffee Layer ("Tablet") and Non-Compacted Coffee Layer(s)

Capsules (as defined in 1.1.) were prepared with respectively 8 g and 6.2 g of roast-and-ground coffee at particle size $D_{4,3}$ of 300 μm. In each capsule a roast-and-ground coffee cylindrical tablet was inserted at dimension corresponding to the internal cross-section of the capsule so that, during extraction, liquid had to traverse the tablet in its way to the outlet wall. The total weight of coffee was completed with non-compacted roast-and-ground coffee.

Capsules #1: A tablet of coffee of diameter 27 mm with a weight of 4 g was produced. 4 g of non-compacted powder was filled in the capsules first prior to inserting the coffee tablet. The capsules contained therefore two layers of roast-and-ground coffee, respectively, loose/tablet. The capsules were sealed with a foil (as defined in 1.1.).

Capsules #2: A tablet of coffee of diameter 27 mm with a weight of 4 g was s produced. 2.2 g of non-compacted powder was filled in the capsules first prior to inserting the coffee tablet. The capsules contained therefore two layers of roast and ground coffee, respectively, loose/tablet. The capsules were sealed with a foil (as defined in 1.1.).

Capsules #3: A tablet of coffee of diameter 24 mm with a weight of 3 g was produced. 1 g of non-compacted powder was filled in the capsules first prior to inserting the coffee tablet. After insertion of the tablet, 4 g of non-compacted powder was filled in the capsule. The capsules contained therefore three layers of roast and ground coffee, respectively, loose/tablet/loose. The capsules were sealed with a foil (as defined in 1.1.).

Capsules #4: A tablet of coffee of diameter 24 mm with a weight of 3 g was produced. 1 g of non-compacted powder was filled in the capsules first prior to inserting the coffee tablet. After insertion of the tablet, 2.2 g of non-compacted powder was further filled in the capsule on top of the tablet. The capsules contained therefore three layers of roast and ground coffee, respectively, loose/tablet/loose. The capsules were sealed with a foil (as defined in 1.1.).

For capsules #1, 2 and 3, two capsules of each sort were tested and, for each the coffee flow was blocked and the machine was stopped before complete extraction.

Figure 27:
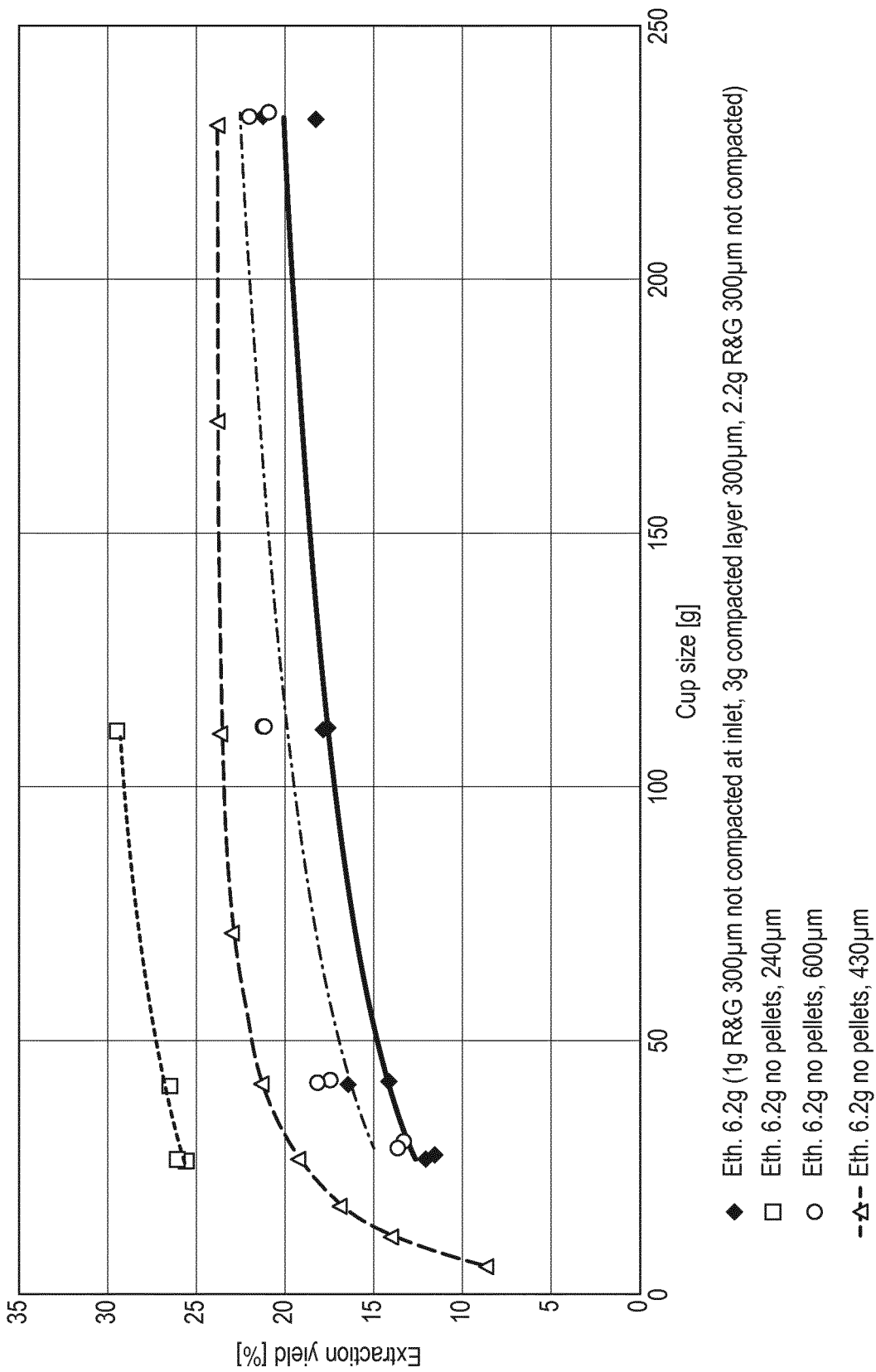
FIG. 27 is a graphic of comparative coffee examples giving the evolution of the extraction yield as a function of the cup size ("Yield kinetics").

The capsule #4 could be successfully extracted up to 230 ml. The kinetic of extraction was measured and compared to the ones of three capsules filled with non-compacted roast-and-ground coffee (6.2 g) at three different particle size $D_{4,3}$, respectively 240, 430 and 600 μm. The results are represented in FIG. 27.

A weak extraction was reported for the capsule #4, despite the relatively fine particle size (even not reaching 20% of yield for a very long cup size of 230 g).

The invention claimed is:

1. A method for preparing a beverage, the method comprising:
providing a capsule comprising containment walls forming an interior cavity containing a beverage precursor for mixing with a liquid in the interior cavity, wherein the beverage precursor comprises a combination of non-compacted beverage extractable powder and pellets of compacted beverage extractable powder, and a largest dimension of each pellet is at least 3.5 millimeters, wherein the containment walls comprise a liquid inlet wall and a beverage outlet wall, and all of the pellets of compacted beverage extractable powder are positioned closer to the liquid inlet wall than to the beverage outlet wall;

feeding the liquid under pressure in the interior cavity containing the beverage precursor to form the beverage; and extracting the beverage out of the capsule, wherein a portion of the beverage is obtained from the pellets of compacted beverage extractable powder, the beverage precursor is essentially roast-and-ground coffee, the pellets are also essentially roast-and-ground coffee, and a percentage of the pellets to a total weight of the roast- and-ground coffee in the cavity is between 20 and 80 wt. %, the pellets are compacted from loose roast-and-ground coffee powder with an average diameter $D_{4,3}$ comprised between 600 μm and 1000 μm, and the non-compacted beverage powder is roast-and-ground coffee with an average diameter $D_{4,3}$ between 160 μm and 1000 μm; and an envelope density of the pellets of compacted beverage extractable powder is between 500 g/l and 800 g/l.

2. The method of claim 1, wherein the largest dimension of each pellet is smaller than any cross-section of the interior cavity.

3. The method of claim 1, wherein the largest dimension of each pellet is smaller than 25 mm.

4. The method of claim 1, wherein the percentage of pellets to the total weight of the roast-and-ground coffee in the cavity is between 25 and 75 wt. %.

5. The method of claim 1, wherein the pellets are compacted with a compaction pressure of at least 5 kN/cm².

6. The method of claim 1, wherein a volume of each pellet is between 45 and 1200 mm³.

7. The method of claim 1, wherein a filling density of the beverage precursor in the interior cavity is between 0.35 and 0.68 g/ml.

8. The method of claim 1, wherein the pellets have a shape selected from the group consisting of spheres, cylinders, cubes, pyramids, cones, frustum-cones, parallelepiped, oblong, ellipsoid and combinations thereof.

9. The method of claim 1, wherein the capsule comprises a cup-shaped body and the beverage outlet wall is (i) closed and comprises a closed perforable or tearable foil sealed on the cup-shaped body; or (ii) pre-opened and comprises a porous or perforate mono- or multi-layer provided with a plurality of exit openings, the mono- or multi-layer sealed on or inside the cup-shaped body.

10. The method of claim 1, wherein the percentage of the pellets to the total weight of the roast-and-ground coffee in the cavity is between 30 and 80 wt. %.

11. The method of claim 1, wherein the non-compacted beverage extractable powder has a tapped density of less than 450 g/l.

12. The method of claim 1, wherein 60 wt. % of the pellets are positioned closer to the liquid inlet wall than to the beverage outlet wall.

13. The method of claim 1, wherein a smallest dimension of each pellet is at least 1.5 millimeters.

14. The method of claim 1 comprising:
filling the capsule with the pellets of compacted beverage extractable powder;
after filling the capsule with the pellets of compacted beverage extractable powder, filling the capsule with the non-compacted beverage extractable powder; and
filling a remaining free space in the interior cavity of the capsule with an inert gas.

15. The method of claim 1, wherein the total weight of the roast-and-ground coffee in the cavity is 8 g.

16. The method of claim 1, wherein the pellets have a shape of a cylinder having a diameter of 11.28 mm.

* * * * *